(12) United States Patent
Yamamoto et al.

(10) Patent No.: US 8,611,680 B2
(45) Date of Patent: Dec. 17, 2013

(54) METHOD AND APPARATUS FOR REMOVING IMAGE NOISE

(75) Inventors: Yutaka Yamamoto, Kyoto (JP);
Masaaki Nagahara, Kyoto (JP); Akira Kobayashi, Yokohama (JP)

(73) Assignee: Kyoto University, Kyoto (JP)

( * ) Notice: Subject to any disclaimer, the term of this patent is extended or adjusted under 35 U.S.C. 154(b) by 699 days.

(21) Appl. No.: 12/745,011

(22) PCT Filed: Nov. 11, 2008

(86) PCT No.: PCT/JP2008/003481
§ 371 (c)(1),
(2), (4) Date: May 27, 2010

(87) PCT Pub. No.: WO2009/069292
PCT Pub. Date: Jun. 4, 2009

(65) Prior Publication Data
US 2011/0002552 A1    Jan. 6, 2011

(30) Foreign Application Priority Data
Nov. 30, 2007  (JP) .................................. 2007-309801

(51) Int. Cl.
*G06K 9/36* (2006.01)
*G06K 9/40* (2006.01)

(52) U.S. Cl.
USPC .......................................... 382/233; 382/268

(58) Field of Classification Search
None
See application file for complete search history.

(56) References Cited

U.S. PATENT DOCUMENTS

| | | | | |
|---|---|---|---|---|
| 5,172,227 A | * | 12/1992 | Tsai et al. | 375/240.2 |
| 5,325,125 A | * | 6/1994 | Naimpally et al. | 375/240.12 |
| 5,563,662 A | * | 10/1996 | Kishi | 375/240.24 |
| 5,621,467 A | * | 4/1997 | Chien et al. | 375/240.15 |
| 5,852,681 A | * | 12/1998 | Amaratunga et al. | 382/268 |
| 6,750,798 B2 | * | 6/2004 | Honda | 341/155 |
| 6,870,494 B1 | * | 3/2005 | Cheng et al. | 341/144 |
| 7,194,143 B2 | * | 3/2007 | Sowa | 382/265 |

(Continued)

FOREIGN PATENT DOCUMENTS

| | | |
|---|---|---|
| JP | A-2001-127637 | 5/2001 |
| JP | A-2001-358561 | 12/2001 |

(Continued)

OTHER PUBLICATIONS

Chinese Office Action issued in Chinese Application No. 200880118470.0 dated Aug. 30, 2012 (w/translation).

(Continued)

*Primary Examiner* — Wenpeng Chen
(74) *Attorney, Agent, or Firm* — Oliff and Berridge, PLC

(57) ABSTRACT

An FFT analysis is performed on the decoded image data of one frame, and a cutoff frequency based on the assumption that the original signal has first-order attenuation characteristics is obtained in both the horizontal and vertical directions. A sampled-data $H^\infty$ filter (digital filter), previously designed to have different parameters corresponding to different cutoff frequencies is selected. By using this filter, a filtering process is performed on the image data decoded both in the horizontal and vertical directions. Since the variety of the analog frequency characteristics of the original image is taken into account for every frame of the image, the information that seems to be noise in the original image is less likely to be removed, and mosquito noise and block noise associated with a coding/decoding process can be efficiently removed.

19 Claims, 18 Drawing Sheets

(56) References Cited

U.S. PATENT DOCUMENTS

| | | | |
|---|---|---|---|
| 7,489,829 B2* | 2/2009 | Sorek et al. | 382/260 |
| 2003/0202713 A1* | 10/2003 | Sowa | 382/260 |
| 2004/0197028 A1* | 10/2004 | Lin et al. | 382/279 |
| 2005/0175247 A1 | 8/2005 | Kitamura et al. | |
| 2007/0071353 A1 | 3/2007 | Kitamura et al. | |
| 2007/0147709 A1* | 6/2007 | Lee et al. | 382/299 |
| 2007/0230812 A1* | 10/2007 | Ku | 382/250 |
| 2009/0034876 A1* | 2/2009 | Diggins | 382/286 |

FOREIGN PATENT DOCUMENTS

| | | |
|---|---|---|
| JP | A-2005-227838 | 8/2005 |
| JP | A-2005-295371 | 10/2005 |
| JP | A-2006-140818 | 6/2006 |

OTHER PUBLICATIONS

Fujiyama et al., "High Frequency Compensation for Compressed Digital Audio using Sampled-Data Control," *119th Audio Engineering Society Convention Paper 6534*, Oct. 7-10, 2005.

Nov. 30, 2011 Office Action issued in European Patent Application No. 08 855 253.4.

Bjontegaard et al., "Adaptive Deblocking Filter," *IEEE Transactions on Circuits and Systems for Video Technology*, vol. 13, No. 7, pp. 614-619, Jul. 1, 2003.

Yamamoto, Y., "A New Approach to Signal Processing via Sampled-Data Control Theory," *2004 5th Asian Control Conference*, Jul. 20-23, vol. 1, pp. 17-24, Jul. 20, 2004.

European Search Report issued in Application No. 08855253.4; Dated Oct. 20, 2010.

Apr. 4, 2012 Office Action issued in European Patent Application No. 08 855 253.4.

Written Opinion of the International Searching Authority dated Mar. 3, 2009 in International Patent Application No. PCT/JP2008/003481 (with translation).

Jul. 5, 2011 Office Action issued in European Patent Application No. 08855253.4.

Cahill, B et al.: "Locally Adaptive Deblocking Filter for Low Bit Rate Video", Sep. 10, 2000, vol. 2, pp. 664-667, IEEE, New York, US.

Kakemizu et al., "Noise Reduction of JPEG Images by Sampled-Data $H^\infty$ Optimal eFilters," *SICE Annual Conference*, 2005, pp. 1080-1085, Okayama University, Japan.

Kobayashi et al., "Noise Reduction of MPEG Videos by Sampled-data Control Theory," *Proceedings of the 51st Annual Conference of the Institute of Systems, Control and Information Engineers*, May 16, 2007, Japan (with abstract).

Mar. 3, 2009 International Search Report issued in corresponding International Patent Application No. PCT/JP2008/003481 (with translation).

Dec. 31, 2011 Office Action issued in Chinese Patent Application No. 200880118470.0 (with translation).

Office Action dated Mar. 5, 2013 in counterpart Chinese Patent Application No. 200880118470.0, with English summary and translation of Reason for Rejection.

\* cited by examiner

DATA READOUT IN ONE IMAGE (a) PROCESSING IN THE HORIZONTAL DIRECTION (b) PROCESSING IN THE VERTICAL DIRECTION (a) UNPROCESSED IMAGE (b) PROCESSED IMAGE (a) UNPROCESSED IMAGE (b) PROCESSED IMAGE (a) UNPROCESSED IMAGE (b) PROCESSED IMAGE

Barbara: ORIGINAL IMAGE

Barbara: AFTER STATIC FILTERING PROCESS

Barbara: AFTER ADAPTIVE FILTERING PROCESS

Woman: ORIGINAL IMAGE

Woman: AFTER STATIC FILTERING PROCESS

Woman: AFTER ADAPTIVE FILTERING PROCESS

Text: ORIGINAL IMAGE

Text: AFTER STATIC FILTERING PROCESS

Text: AFTER ADAPTIVE FILTERING PROCESS

METHOD AND APPARATUS FOR REMOVING IMAGE NOISE

TECHNICAL FIELD

The present invention relates to a method and apparatus for removing a noise which is generated when a digitized and compression-encoded still image or moving image is decoded and reproduced.

BACKGROUND ART

In recent years, the technology for compressing a still image or a moving image has been remarkably progressing. Such a compressing technology is widely used for recording or reproducing images in or from recording media such as optical disks, hard disks, or solid-state memories, and for transmitting images through communication channels such as the Internet. It is also used in the field of broadcasting. As a method for compressing a still image, Joint Photographic Experts Group (JPEG) method is well known, and as a method for compressing a moving image, Moving Picture Experts Group (MPEG) method is well known. Other than these, a variety of methods have been proposed and put to practical use.

It is known that, during a coding/decoding process for compressing/decompressing image data, a variety of noises which are not in the original image are generated. Block noise and mosquito noise are typical noises. Block noise is caused by the operation of compressing data in which one frame of image is divided into plural areas or blocks to process each block independently, and generated near the boundaries of the blocks. Mosquito noise is caused in the process of compression in which the image data is frequency-resolved by the discrete cosine transform (DCT) and the high-frequency components are removed. In the Fourier analysis, this kind of noise generation is generally called the Gibbs phenomenon. Both of these noises become more noticeable as the compression ratio is increased in order to enhance the recording or transmission efficiencies. Hence, conventionally, a variety of methods for removing or minimizing such noises have been studied and developed (for example, refer to Patent Documents 1 and 2, and other documents).

Removing visually unpleasant and annoying noises as previously described is one of the very important techniques both in processing a still image and in processing a moving image. However, if the noise removal effect is increased to enhance the image quality, a part of the image information which is not a noise but essentially needed may be lost, possibly making the image unnatural and unattractive. In general, performing an advanced noise removal complicates the process and increases the circuit size. This brings about a problem of a rise in the cost and an increase in the size of the circuit board.

Over the years, the inventors of the present patent application have been conducting research on the attempt, particularly in the field of digital audio, to introduce the sampled-data control theory capable of handling the continuous-time feature, more specifically, sampled-data $H^\infty$ control, into the digital/analog (D/A) conversion technology, sampling rate conversion technology, and other technologies which handle digital audio signals (refer to Patent Documents 3 and 4, and other documents). This technology aims at optimizing or nearly optimizing the acoustic sound quality as an analog audio by designing the digital filter for the D/A conversion or sampling rate conversion, not only by considering the sample of an original digital signal as a simple discrete-time signal but also by taking the analog frequency characteristics included in the response among samples into account.

In other words, the aforementioned filtering technology is an attempt to pursue the natural sound which is as close to the original analog audio as possible, under the limitations of a predetermined sampling frequency and quantization bit rate. This filter, which is called the "YY filter," has been put to practical use in integrated circuits (ICs) for mobile phones and portable music players, and in other devices.

In view of the progress of the image compression technology in recent years as described earlier and the need for improving the picture quality associated therewith, the inventors of the present patent application have been pursuing the attempt to apply the sampled-data $H^\infty$ optimization method which is the basics of the aforementioned technology to removing an image noise. And they have already disclosed an example in which it is applied to remove the noise of a still image (refer to Non-Patent Document 1) and an example in which it is applied to remove the noise of a moving image (refer to Non-Patent Document 2). A study of these conventional image removal techniques confirmed that block noise could be effectively removed by applying the sampled-data $H^\infty$ optimization method to the noise removal of an image. However, the study also indicated that there were problems in that a part of information which was not originally a noise might be regarded as a noise to be removed, or inversely, a noise might be erroneously recognized as a part of image information and remains unremoved.

Patent Document 1: Japanese Unexamined Patent Application Publication No. 2005-295371
Patent Document 2: Japanese Unexamined Patent Application Publication No. 2006-140818
Patent Document 3: Japanese Unexamined Patent Application Publication No. 2001-127637
Patent Document 4: Japanese Unexamined Patent Application Publication No. 2001-358561
Non-Patent Document 1: Kakemizu, Nagahara, Kobayashi, and Yamamoto, "Noise Reduction of JPEG Images by Sampled-Data $H^\infty$ Optimal $\epsilon$ Filters," SICE Annual Conference 2005, pp. 1080-1085
Non-Patent Document 2: Kobayashi, Nagahara, Yamamoto, "Noise Reduction of MPEG Videos by Sampled-Data Control Theory," Proceedings of the 51st Annual Conference of the Institute of Systems, Control and Information Engineers, May 16, 2007

DISCLOSURE OF THE INVENTION

Problem to be Solved by the Invention

The present invention has been accomplished in view of the previously described problem, and the objective thereof is to provide a method and apparatus for removing a noise of an image capable of effectively removing a block noise and a mosquito noise which are generated on a moving image and still image in connection with the encoding and decoding process, while suppressing the influences on the contents of the information that the image originally has.

Means for Solving the Problem

To solve the previously described problem, the first aspect of the present invention provides a method for removing an image noise which is generated when image data which have been compression-encoded in a given format are decoded to reproduce an image, including:

a) a deduction step for examining a digital frequency response of image data which compose an image of a complete image or a frame of image and have been compression-encoded/decoded, to deduce analog frequency characteristics of the image before compression encoding;

b) a parameter setting step for changing a parameter of a below-mentioned digital filter in accordance with a deduction result by the deduction step; and c) a processing step for performing a filtering process to the image data after they are decoded and before they are digital/analog converted by using a sampled-data $H^\infty$ filter having a parameter calculated by solving a computational equation with $H^\infty$ control under a predetermined condition or with a rigorous calculation which corresponds to the $H^\infty$ control, the computational equation being obtained by approximately converting a conditional equation to a finite-dimensional discrete-time system, and the conditional equation being set to design the digital filter so as to reduce an error between an original analog image signal and an analog image signal obtained through an analog/digital conversion, coding/decoding, and digital/analog conversion.

The second aspect of the present invention provides an apparatus for removing an image noise which is generated when image data which have been compression-encoded in a given format are decoded to reproduce an image, including:

a) a deduction means for examining a digital frequency response of image data which compose an image of a complete image or a frame of image and have been compression-encoded/decoded, to deduce analog frequency characteristics of an image before compression encoding;

b) a parameter setting means for changing a parameter of a below-mentioned digital filter in accordance with a deduction result by the deduction means; and c) a processing means for performing a filtering process to the image data after they are decoded and before they are digital/analog converted by using a sampled-data $H^\infty$ filter having a parameter calculated by solving a computational equation with $H^\infty$ control under a predetermined condition or with a rigorous calculation which corresponds to the $H^\infty$ control, the computational equation being obtained by approximately converting a conditional equation to a finite-dimensional discrete-time system, and the conditional equation being set to design the digital filter so as to reduce an error between an original analog image signal and an analog image signal obtained through an analog/digital conversion, coding/decoding, and digital/analog conversion.

In the method and apparatus for removing an image noise according to the present invention, for example, the processing object of the noise removal may be a still image which is compression-encoded in JPEG format, or a moving image which is compression-encoded in MPEG format.

In the method and apparatus for removing an image noise according to the present invention, in the deduction step (deduction means), a fast Fourier transform (FFT) process may be performed to the image data which compose one image (in the case of a still image) or one frame (in the case of a moving image) and which have been compression-encoded/decoded. More specifically, on the assumption that the analog frequency characteristics in the image before compression encoding are a lowpass filter having attenuation characteristics of a given order, a cutoff frequency of the lowpass filter may be calculated by the FFT for example.

In place of using the FFT, a filter bank having filters whose frequency characteristics are different from each other may be prepared, and by finding the largest signal intensity (amplitude value) among the signal intensities obtained from the image data through those many filters, the digital frequency characteristics are examined to obtain an appropriate cutoff frequency.

The aforementioned given order may be a second order, third order, or higher order. However, it is sufficient to assume that the lowpass filter has the simplest, first-order attenuation characteristics. A study by the inventors of the present patent application confirmed that, regardless of the information contents of one still image or the image corresponding to one frame of a moving image, the analog frequency characteristics of the original image can be fairly appropriately approximated with first-order attenuation characteristics, and that the difference of the information contents appear on the cutoff frequency. Therefore, even if the analog frequency characteristics of the original image are determined under the previously described, considerably simple assumption that requires only a simple arithmetic processing, the eligibility of the determination can be sufficiently assured.

In the method and apparatus for removing an image noise according to the present invention, the analog frequency characteristics of the original image before it is digitalized are taken into account and the noise is minimized with an evaluation criterion using the $H^\infty$ norm. This noise-removing method itself is not significantly different from the prior method used for removing a noise in digital audio and for removing a noise of a still or moving image. However, in the conventional method for removing a noise of a still or moving image, the difference in the analog frequency characteristics of the original image is not reflected in the parameter (generally, filter coefficient) of the digital filter. On the other hand, in the present invention, from the image which has been compression-encoded/decoded, the analog frequency characteristics of the original image, i.e. those of the image before the compression and analogue/digital conversion, are deduced. Then, based on the deduction result, the parameter of the digital filter, i.e. its characteristics, is adaptively changed. Therefore, the criterion for determining whether a small portion that appears to differ from the surroundings on the image is a noise or not is changed in accordance with the analog frequency characteristics of the original image.

The filtering process in the processing step and in the processing means may be preferably performed to each of the image data aligned in the horizontal direction and the image data aligned in the vertical direction of an image of a complete image or a frame of image.

The parameter of the digital filter may be determined for each image or each frame of image. However, in order to more appropriately remove unnecessary noises and leave the information portion which is not a noise, it is preferable to adaptively change the parameter of the digital filter also within each image or each frame of image.

That is, as a preferable embodiment of the method for removing an image noise according to the first aspect of the present invention, it is preferable that, in the deduction step, an image of a complete image or a frame of image may be sectionalized into small areas in each of which the analog frequency characteristics in the image before compression encoding can be considered to be similar and the analog frequency characteristics are deduced for each of the small areas; and in the parameter setting step, the parameter of the digital filter may be changed for each of the small areas.

Although the small areas can be a two-dimensional area in the image, practically, it is preferably a one-dimensional area in the horizontal or vertical direction. For example, when the image data aligned in the horizontal direction or vertical direction of an image of a complete image or a frame of image are sequentially scanned, a point where the variation of the data value is equal to or more than a predetermined threshold in a horizontal line or in a vertical line can be defined as a boundary of the small areas so that the two areas before and after the boundary will be different small areas. In order to prevent any spike noise superposed on the data from being defined to be the boundary of a small area, or in order to prevent the small area from being too small in size in the case of scanning an area including thin stripes, it is preferable to appropriately set the threshold, and the values before and after the data changing point above the threshold may be added to the criterion for determining whether or not it is the boundary of a small area.

In the method and apparatus for removing an image noise according to the present invention, the sampled-data $H^\infty$ filter is a linear filter. Hence, if the filtering is performed only with this filter, edges on an image which contains particularly high-frequency components might become blurry in removing high-frequency noises. In order to avoid this problem, it is preferable to combine the sampled-data $H^\infty$ filter with an ε-separating nonlinear filter so as to distinguish between a high-frequency noise and an edge portion of the original signal to remove only the noise.

Effects of the Invention

With the method for removing an image noise according to the first aspect of the present invention and with the apparatus for removing an image noise according to the second aspect of the present invention, while the information of small areas originally included in the original image and the information which is difficult to be discriminated from the block noise or mosquito noise for example are left as much as possible, these noises can be accurately removed. Accordingly, a high image quality can be achieved which does not degrade the quality of the original image, while making the block noise and mosquito noise less noticeable which are likely to appear when the compression rate is increased in MPEG format for example.

The structure of the sampled-data $H^\infty$ filter is not different from that of a general digital filter. If the number of taps is small, the circuit size can be small, and the operation of the FFT and filter bank used for deducing the analog frequency characteristics of the original image is not inherently difficult. Therefore, it is possible to prevent a substantial increase in the cost for removing a noise. In addition, the sampled-data $H^\infty$ filter can be easily integrated on an LSI, allowing a downsizing.

EXPLANATION OF NUMERALS

11 ... Filter
12 ... Sampler
13 ... Accumulator
14 ... Digital Filter
15 ... Zero-Order Holding Element
16, 18 ... Lag Element
17 ... Subtracter
20, 30 ... Data Bus
21, 31 ... Frame Memory
22, 32 ... R/W controller
23 ... Frequency Characteristics Analyzer
24, 36 ... Filter Coefficient Determining Unit
25, 37 ... Filtering Processor
33 ... Small Area Deducing Unit
34 ... Filter Bank
35 ... Frequency Characteristics Deducing Unit

BEST MODES FOR CARRYING OUT THE INVENTION

Hereinafter, an embodiment of the method and apparatus for removing an image noise according to the present invention (which will be hereinafter referred to as the "first embodiment") will be described with reference to the figures.

Figure 2:
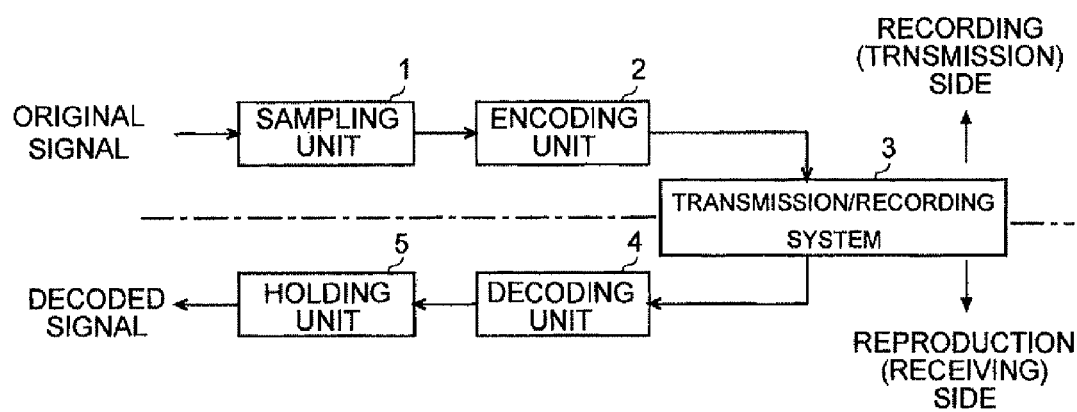
FIG. 2 is a schematic block configuration diagram of a digital moving image processing system, which is an example of the object to which the method for removing an image noise according to the present invention is applied.

FIG. 2 is a schematic block configuration diagram of a digital moving image processing system, which is an example of the object to which the method for removing an image noise according to the present invention is applied. The original signal is first sampled, in a sampling unit 1, at a predetermined sampling frequency to be a discrete-time signal. In the subsequent unit, i.e. in an encoding unit 2, this signal is quantized at a given bit rate to be a digital signal, and data-compressed according to a given algorithm such as an MPEG method. The compressed data is transmitted on a transmission line or recorded in a record medium in a transmission/recording system 3. The data obtained via the transmission line or through a process of recording/reproduction (or memorizing/readout) are decompressed and the digital signal is converted to an analog signal by a decoding process in a decoding unit 4. Further, in a holding unit 5, the discrete-time signal is converted into a continuous-time signal to be provided as a restored signal.

As illustrated in FIG. 2, the sampling unit 1, the encoding unit 2, and a part of the transmission/recording system 3 are included in a recording device or transmitting device. The remaining part of the transmission/recording system 3, the decoding unit 4, and the holding unit 5 are included in the reproducing device or receiving device.

Figure 1:
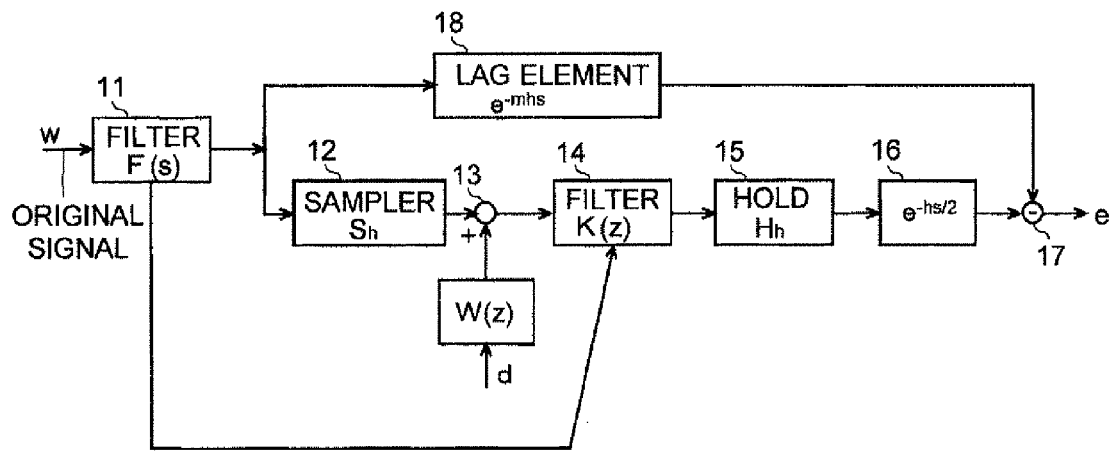
FIG. 1 is a block diagram of an error system model for designing a filter K(z) which is used for the method for removing an image noise according to the present invention.

In the noise removal, i.e. filtering, which uses the sampled-data control theory, the decoding unit 4 is designed such that the original signal, which is the input to the digital moving image processing system, and the restored signal, which is the output, may be as close as possible, i.e. their difference may be as small as possible. At this point, the error system model illustrated in FIG. 1 is considered. This is a block diagram of the design of a filter K(z) for removing an image noise.

In FIG. 1, the lower signal path is a digital moving image system, and the upper signal path is a time-lag system for designing an acausal filter. That is, an original signal w which is a continuous-time signal is band-limited by the filter 11 included in an A/D converter. Then, in the digital moving image processing system, it is sampled at a sampling period h by the sampler 12 to be a discrete-time signal (digital signal). Although the high-frequency components are cut in the filter 11, the basic frequency components of the original signal w remain. Here, the analog frequency characteristics of the original signal w are referred to as F(s), and the sampling is referred to as $S_h$ as an ideal sampler.

To the digital signal, a process of coding (compression) and decoding (decompression) is performed. In the course of this process, a noise with frequency characteristics which are in accordance with the transfer function of W(z) is added to the digital signal in the accumulator 13. This is a modeled noise of block noise, mosquito noise, and other noise, and the transfer characteristics W(z) have the characteristics of a high-pass filter. To the signal to which the noise has been added, a noise removal and a signal correction based on the frequency characteristics F(s) of the original signal are performed in the digital filter 14 with transfer characteristics of K(z). Then, the signal is restored to a continuous-time signal by the zero-order holding element 15. Subsequent to the zero-order holding element 15, the lag element 16 for one half of the sampling period h is inserted in order to insure that the coefficient of the designed filter in the past direction and that in the future direction are symmetrical with respect to the sample point (refer to Non-Patent Document 2).

Meanwhile, in the time-lag system on the upper side, the lag element 18 ($e^{-mhs}$) of the integral multiple of the sample interval is given to the original signal. Then, by the subtracter 17, the difference signal e between the restored signal which has passed the aforementioned processing system and the delayed original signal is taken out. It is required to determine the transfer function K(z) of the digital filter 14 such that the difference signal e is as small as possible, and obtain a parameter to realize this. For that purpose, systems for converting the original signal w and noise d into the difference signal e are referred to as $T_{ew}$ and $T_{ed}$, respectively. The design problem of the digital filter 14 with a transfer function K(z) is defined as follows.

That is, with transfer functions F(s) and W(z), a lag step m, and a constant γ>0, a digital filter which satisfies the following equation (1) is designed.

$$\left\| [T_{ew}, T_{ed}] \right\|^2 := \sup_{w \in L^2, d \in l^2} \frac{\|e\|_{L_2}^2}{\|w\|_{L^2}^2 + \|d\|_{l^2}^2} < \gamma^2 \qquad (1)$$

This equation (1) is the conditional equation set to design the digital filter in the present invention. This problem is the very sampled-data $H^\infty$ optimization problem. By applying the sampled-data control theory, the $H^\infty$ optimized filter K(z) can be easily obtained by using a computer. As the specific method, the methods that the inventors of the present invention have disclosed in Patent Documents 1 and 2, Non-Patent Document 2, and other documents can be used. Thereby, the filter coefficient of the digital filter can be obtained.

Design Problem
(From Non-Patent Document 1)

The description presented in this section and the next (Optimal Filter) highlight a design problem and solution as disclosed by Non-Patent Document 1.

Figure 22A:
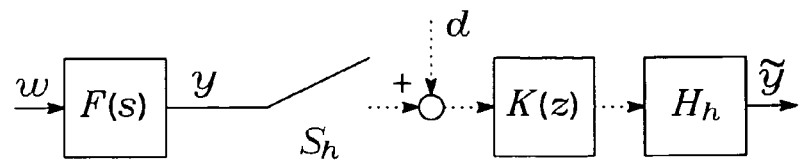
FIG. 22A is a block diagram illustrating a signal reconstruction as discussed in the DESIGN PROBLEM section of the disclosure taken from Non-Patent Document 1.

Consider the block diagram shown in FIG. 22A. The incoming signal (image) w first goes through an analog filter F(s) and the filtered signal y becomes nearly (but not entirely) band-limited. The filter F(s) governs the frequency-domain characteristic[1] of the analog signal w. The signal y is then sampled by the sampler $S_h$ with sampling period h to become a discrete-time (or discrete-space) signal. Then, the signal is corrupted by the additive noise d. The filter K(z) attempts to reduce the noise and to reconstruct the original image. Then the filtered signal becomes an analog (i.e., continuous-time) signal by a hold device $H_h$ and we obtain the reconstructed signal ỹ.

[1] In the conventional design, F(s) is considered to be an ideal filter that has the cut-off frequency up to the Nyquist frequency.

Figure 22B:
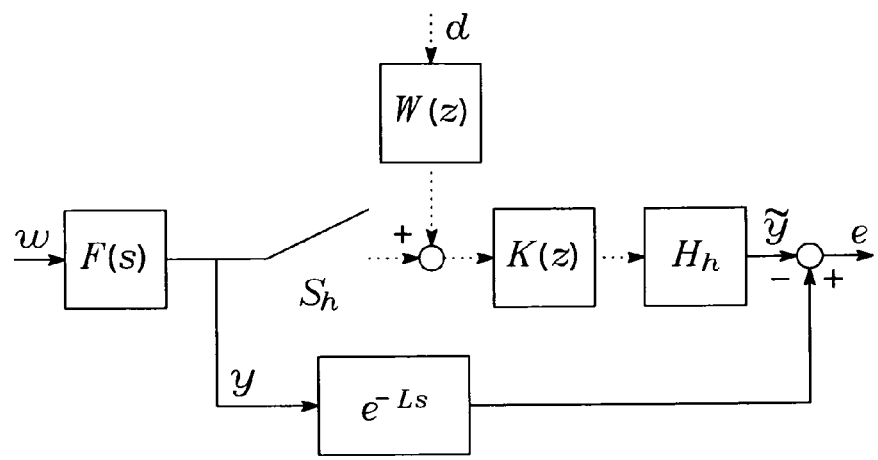
FIG. 22B is a block diagram illustrating a signal reconstruction error system as discussed in the DESIGN PROBLEM section of the disclosure taken from Non-Patent Document 1.

We thus consider the block diagram shown in FIG. 22B that is the signal reconstruction error system for the design. In the diagram the following points are taken into account:

The time delay $e^{-Ls}$ is introduced because we allow a certain amount of time delay for signal reconstruction.

The noise obeys a frequency characteristic W(z).

Our design problem is defined as follows:

Problem 1. Given a stable, strictly proper, continuous-time F(s), stable proper discrete-time W(z), sampling period h, find the digital filter K(z) that minimizes.

$$J(K) := \sup_{w \in L^2, d \in \ell^2} \frac{\|e\|_{L^2}^2}{\|w\|_{L^2}^2 + \|d\|_{\ell^2}^2}.$$

$H^\infty$ Optimal Filter
(From Non-Patent Document 1)

Problem 1 involves a continuous-time delay, and hence it is an infinite-dimensional sampled-data $H^\infty$ optimization problem. The problem is, however, reducible to a finite-dimensional discrete-time one via fast sampling/hold approximation[5] or discretization preserving the $H^\infty$ norm[7]. We here discuss the norm preserving discretization.

Figure 22C:
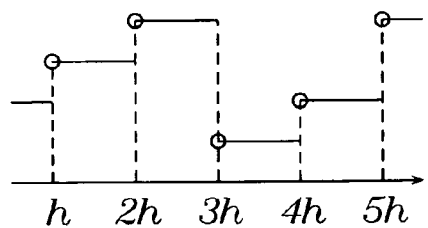
FIG. 22C illustrates the conversion of a discrete time signal into a continuous time signal by causally holding the discrete time signal over the sampling interval as discussed in the DESIGN PROBLEM section of the disclosure taken from Non-Patent Document 1.
Figure 22D:
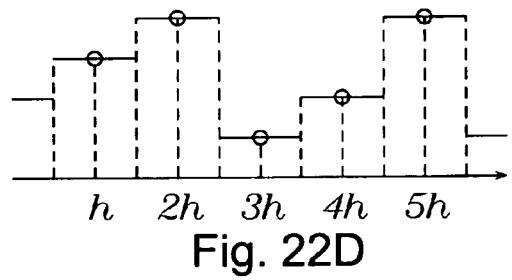
FIG. 22D illustrates the conversion of a discrete time signal into a continuous time signal for non-causal signals such as images as discussed in the DESIGN PROBLEM section of the disclosure taken from Non-Patent Document 1.

Non-Causal Hold For Image Reconstruction By usual, a zero-order hold is used for converting discrete-time signals into continuous-time ones. The most common method is to causally hold the discrete-time signals constant over the sampling intervals as shown in FIG. 22C. The causal hold is appropriate for causal signals such as audio ones, whereas non-causal hold as shown in FIG. 22D is more suitable for non-causal signals such as images. The non-causal hold $H_h$ is given as follows.

$$H_h : l^2 \ni u_d \to u \in L^2,$$

$$u(kh+\theta) := u_d[k]\phi(\theta),$$

$$\theta \in [-h/2, h/2), k=0,1,2,\ldots,$$

where $\phi$ is a hold function defined by $$\phi(\theta) := \begin{cases} 1, & \theta \in [-h/2, h/2) \\ 0, & \text{otherwise.} \end{cases}$$

Reduction to a Finite-Dimensional Problem

Let $T_{ew}$ denote the input/output operator of the error system shown in FIG. 22B, and $\{A, B, C, 0\}$ be a minimal realization of F(s). By the linear fractional transformation[11], $T_{ew}$ is represented by $F_l(G_0, H_h K S_h)$, where $$G_0(s) := \begin{bmatrix} e^{-Ls}F(s) & -1 \\ F(s) & 0 \end{bmatrix}.$$

Assume L=mh, m∈$\mathbb{Z}_+$:={0, 1, 2, . . . }. Then, for any γ>0, we have[6]

$$\|F_l(G_0 \cdot K)\|_\infty < \gamma \Leftrightarrow \|F_l(G \cdot \overline{K})\|_\infty < \gamma.$$

where $\overline{K}(z) := z^m K(z)$ and $$G(s) := \begin{bmatrix} F(s) & -1 \\ F(s) & 0 \end{bmatrix} = \left[\begin{array}{c|cc} A & B & 0 \\ \hline C & 0 & -1 \\ C & 0 & 0 \end{array}\right].$$

By lifting G, we have the lifted system[2]

$$\breve{G}(z) = \left[\begin{array}{c|cc} \overline{A}_d & \acute{B}_{d1} & \overline{B}_{d2} \\ \hline \grave{C}_{d1} & \breve{D}_{d11} & \grave{D}_{d12} \\ \overline{C}_{d2} & 0 & 0 \end{array}\right], \overline{A}_d = \begin{bmatrix} \overline{A} & 0 \\ 0 & 0 \end{bmatrix}. \quad (2)$$

$$\acute{B}_{d1} = \begin{bmatrix} \acute{B}_1 \\ 0 \end{bmatrix}, \overline{B}_{d2} = \begin{bmatrix} 0 \\ 1 \end{bmatrix}.$$

$$\grave{C}_{d1} = [\grave{C}_1 \ \grave{C}_\mathcal{H}], \overline{C}_{d2} = [C \ 0],$$

$$\breve{D}_{d11} = \breve{D}_{11}, \grave{D}_{d12} = \grave{D}_\mathcal{H},$$

where $\{\overline{A}, \acute{B}_1, \grave{C}_l, \breve{D}_{11}\}$ is a state-space realization of the lifted system of F(s):

$$\begin{cases} x[k+1] = \overline{A}x[k] + (\acute{B}_1 w)[k], \\ y[k](\theta) = (\grave{C}_1 x[k])(\theta) + (\breve{D}_{11}w)[k](\theta). \end{cases}$$

$$\overline{A} := e^{Ah},$$

$$\acute{B}_1 : L^2[0, h) \to \mathbb{R}^n : w \mapsto \int_0^h e^{A(h-\tau)} Bw(\tau) d\tau,$$

$$\grave{C}_1 : \mathbb{R}^n \to L^2[0, h) : x \mapsto Ce^{A\theta}x,$$

$$\breve{D}_{d11} : L^2[0, h) \to L^2[0, h),$$

$$: w \mapsto \int_0^\theta Ce^{A(\theta-\tau)} Bw(\tau) d\tau, \theta \in [0, h),$$

and $\{\grave{C}_H, \grave{D}_H\}$ is defined by lifting the non-causal hold $H_h$ (1):

$$\begin{cases} \sigma[k+1] = u_d[k], \\ \tilde{y}[k](\theta) = (\grave{C}_\mathcal{H} \sigma[k])(\theta) + (\grave{D}_\mathcal{H} u_d[k])(\theta). \end{cases}$$

$$\grave{C}_H : \mathbb{R} \to L^2[0,h), : \sigma \mapsto \phi(\theta+h)\sigma$$

$$\grave{D}_H : \mathbb{R} \to L^2[0,h), : u_d \mapsto \phi(\theta)u_d, \theta \in [0,h).$$

For the sampled-data system $F_l(G,K)$, a norm-equivalent discrete-time system is obtained[1] assuming $\gamma_h = \|\breve{D}_{\bar{1}\bar{1}}\| < \gamma$ (. However, since K can be a non-causal filter, it is possible that the optimal γ can be less than $\|\breve{D}_{\bar{1}\bar{1}}\|$ by a non-causal K. Therefore, we adopt a discretization method which is independent of controller causality constraints[7].

Let $\Pi_B$ be the orthogonal projection of $L^2[0,h)$ on the null space $N(B_{d1})$. This is obtained by $\Pi_B = I - B^*_{d1}(B_{d1}B^*_{d1})^\dagger B_{d1}$ where "†" indicates the pseudoinverse. For the system (2), define a discrete-time system G by $$\bar{G}(z) := \left[\begin{array}{c|cc} \bar{A} & \bar{B}_1 & \bar{B}_2 \\ \hline \bar{C}_1 & \bar{D}_{11} & \bar{D}_{12} \\ \bar{C}_2 & 0 & 0 \end{array}\right],$$

where $\bar{B}_1$ is a matrix which satisfies $$\bar{B}_1 \bar{B}'_1 = \acute{B}_{d1} \acute{B}^*_{d1},$$

and $\bar{C}_1, \bar{D}_{11}, \bar{D}_{12}$ are matrices which satisfy $$\bar{D}_{11} = \bar{D}_a \bar{B}_1,$$

$$\begin{bmatrix} \bar{C}'_1 \\ \bar{D}'_a \\ \bar{D}'_{12} \end{bmatrix} \begin{bmatrix} \bar{C}'_1 \\ \bar{D}'_a \\ \bar{D}'_{12} \end{bmatrix}' = \acute{O}_z^* \left(I - \gamma^{-2} \breve{D}_{d11} \prod_B \breve{D}_{d11}\right)^{-1} \acute{O}_z,$$

$$\acute{O}_z := [\acute{C}_{d1} \breve{D}_{d11} \acute{B}^*_{d1} (\acute{B}_{d1} \acute{B}^*_{d1})^\dagger \acute{D}_{d12}],$$

for $\gamma > \hat{\gamma}_h := \|\breve{D}_{11} \breve{\Pi}_B\|$. Then we have the following theorem.

Theorem 1 For any stable K, $\|F_l(\breve{G}, \bar{K})\|_\infty \geq \hat{\gamma}_h$. Moreover, for any stable $\bar{K}$ and any $\gamma > \hat{\gamma}_h$, the followings are equivalent.
1. $\|F_l(\breve{G}, \bar{K})\|_\infty < \gamma$.
2. $\|F_l(\bar{G}, \bar{K})\|_\infty < \gamma$.

The proof is given by[4]. By using this theorem, we can design the optimal filter $\bar{K}$ as follows.
1. Give $\gamma > \hat{\gamma}_h$ and compute the state-space realization of the discrete-time system C.
2. Define $$\bar{G}_{aug} := \begin{bmatrix} z^{-m} \bar{G}_{11} & \bar{G}_{12} \\ \bar{G}_{21} & 0 \end{bmatrix}$$

where $\bar{G}_{ij}(z) := \bar{C}_i(zI - \bar{A})^{-1} \bar{B}_j + \bar{D}_{ij}$.
3. Solve a discrete-time $H^\infty$ optimization problem $$\|F_l(\bar{G}_{aug}, k)\| < \gamma.$$

Then $\bar{K} = z^m K$ satisfies $\|F_l(\breve{G}, \bar{K})\| < \gamma$.
For giving $\gamma > \hat{\gamma}_h$, and computing $\bar{G}$, the following lemma is available.

Lemma 1 For $\gamma > 0$, define $$\Phi(t) = \begin{bmatrix} \Phi_{11}(t) & \Phi_{12}(t) \\ \Phi_{21}(t) & \Phi_{22}(t) \end{bmatrix} := \exp\left(\begin{bmatrix} A & BB' \\ 0 & -A' \end{bmatrix} t\right), \quad (3)$$

$$\Gamma(t) = \begin{bmatrix} \Gamma_{11}(t) & \Gamma_{12}(t) \\ \Gamma_{21}(t) & \Gamma_{22}(t) \end{bmatrix} := \exp\left(\begin{bmatrix} A & BB' \\ -\gamma^{-2} C'C & -A' \end{bmatrix} t\right). \quad (4)$$

Then $\gamma > \hat{\gamma}_h$ if and only if for any $t \in (0, h]$, $$\det(\Gamma_{12}(t)) \neq 0.$$

Moreover, we have $$\bar{B}_1 \bar{B}'_1 = \begin{bmatrix} \Phi_{12}(h) \Phi_{22}^{-1}(h) & 0 \\ 0 & 0 \end{bmatrix}, \quad (5)$$

-continued $$\begin{bmatrix} \bar{C}'_1 \\ \bar{D}'_a \\ \bar{D}'_{12} \end{bmatrix} \begin{bmatrix} \bar{C}'_1 \\ \bar{D}'_a \\ \bar{D}'_{12} \end{bmatrix}' = \begin{bmatrix} M_{11} & M'_{21} & M_{13} & M'_{41} \\ M_{21} & M_{22} & M_{23} & M_{24} \\ M'_{13} & M'_{23} & M_{33} & M'_{43} \\ M_{41} & M'_{24} & M_{43} & M_{44} \end{bmatrix}.$$

where each matrix $M_{ij}$ is given in the appendix.
Supplementary Formulas
(From Non-Patent Document 1)
Formula for $M_{ij}$ A. Formula for $M_{ij}$ $$M_{11} = \gamma^2 \{(I - \Phi'_{11}(h)\Gamma_{22}(h))\Gamma_{12}^{-1}(h) \times (\Phi_{11}(h) - \Gamma_{11}(h)) - \Phi'_{11}(h)\Gamma_{21}(h)\},$$

$$M_{13} = \gamma^2 (I - \Phi'_{11}(h)\Gamma_{22}(h))\Gamma_{12}^{-1}(h),$$

$$M_{33} = \gamma^2 (\Phi_{22}(h)\Phi_{12}^{-1}(h) - \Gamma_{22}(h)\Gamma_{12}^{-1}(h)),$$

$$M_{21} = -C \int_0^{h/2} \Gamma_{11}(t) dt$$
$$\quad -C \int_0^{h/2} \Gamma_{12}(t) dt \cdot \Gamma_{12}^{-1}(h)(\Phi_{11}(h) - \Gamma_{11}(h)).$$

$$M_{22} = [\gamma^{-2} C \quad 0] \int_0^{h/2} \Gamma(t) \begin{bmatrix} I & 0 \\ \Gamma_{11}(h) & \Gamma_{12}(h) \end{bmatrix}^{-1} \times$$
$$\left\{\begin{bmatrix} I & 0 \\ 0 & 0 \end{bmatrix} \int_0^t \Gamma(-s) ds \begin{bmatrix} 0 \\ -C' \end{bmatrix} - \begin{bmatrix} 0 & 0 \\ I & 0 \end{bmatrix} \int_t^{h/2} \Gamma(h-s) ds \begin{bmatrix} 0 \\ -C' \end{bmatrix}\right\}$$
$$dt + \frac{h}{2}$$

$$M_{23} = -C \int_0^h \Gamma_{12}(t) dt \cdot \Gamma_{12}^{-1}(h),$$

$$M_{24} = -[\gamma^{-2} C \quad 0]$$
$$\int_t^{h/2} \Gamma(t) dt \begin{bmatrix} I & 0 \\ \Gamma_{11}(h) & \Gamma_{12}(h) \end{bmatrix}^{-1} \times \begin{bmatrix} 0 & 0 \\ I & 0 \end{bmatrix} \int_{h/2}^h \Gamma(h-s) ds \begin{bmatrix} 0 \\ -C' \end{bmatrix}$$

$$M_{41} = -C \int_{h/2}^h \Gamma_{11}(t) dt$$
$$\quad -C \int_{h/2}^h \Gamma_{12}(t) dt \cdot \Gamma_{12}^{-1}(h)(\Phi_{11}(h) - \Gamma_{11}(h)),$$

$$M_{43} = -C \int_{h/2}^h \Gamma_{12}(t) dt \cdot \Gamma_{12}^{-1}(h).$$

$$M_{44} = [\gamma^{-2} C \quad 0] \int_{h/2}^h \Gamma(t) \begin{bmatrix} I & 0 \\ \Gamma_{11}(h) & \Gamma_{12}(h) \end{bmatrix}^{-1} \times$$
$$\left\{\begin{bmatrix} I & 0 \\ 0 & 0 \end{bmatrix} \int_{h/2}^t \Gamma(-s) ds \begin{bmatrix} 0 \\ -C' \end{bmatrix} - \begin{bmatrix} 0 & 0 \\ I & 0 \end{bmatrix} \int_t^h \Gamma(h-s) ds \begin{bmatrix} 0 \\ -C' \end{bmatrix}\right\}$$
$$dt + \frac{h}{2}$$

Conventionally, in the method for removing an image noise that the inventors of the present invention have proposed, the transfer function F(s), or the analog frequency characteristics of the original signal w, is considered to be stable, i.e. constant. However, the noise W(z) which is added in the course of the coding/decoding process intrinsically depends on the value of the original signal, and depends on the analog frequency characteristics F(s) of the original signal. Hence, if the analog frequency characteristics of the original signal are different from the expected state, the digital filter does not ideally operate, causing the problem that the difference signal e in the error system in FIG. 2 increases, i.e. the noise which appear on the reproduced image remains without being removed or inversely a part of information which is not noise is erroneously removed. It is ideal if the analog frequency characteristics of the original signal on the recording side or transmission side can be grasped. However, as a matter of course, the analog frequency characteristics of the original signal cannot be directly known on the reproduction side or on the transmission side. Given this factor, in the method and apparatus for removing an image noise, as the significant feature, the analog frequency characteristics F(s) of the original signal are deduced from a given compressed-data image, and based on the deduction result, the transfer characteristics K(z) of the digital filter are modified to enhance the effect of the noise removal.

In the first embodiment, the analog frequency characteristics F(s) are supposed to be a lowpass filter having first-order attenuation characteristics expressed by the following equation (2). By deducing the cutoff frequency ωc of this lowpass filter, F(s) is deduced.

$$F(s)=\omega c/(s+\omega c) \quad (2)$$

The reasons why F(s) is supposed to have first-order attenuation characteristics are as follows: a result of performing an FFT to a various kinds of images to examine their frequency components confirmed that they show nearly first-order attenuation characteristics; first-order attenuation characteristics have a small number of parameters, which allows an easy deduction of the cutoff frequency ωc and is advantageous to shorten the calculation time; and other reasons.

The cutoff frequency ωc can be deduced in the following procedure for example. First, an FFT is performed to one still image or to an image for one frame of a moving image (which will hereinafter be simply referred to as one frame of image) after a decoding process is performed. Next, the maximum values of each column of the FFT data obtained from the one frame of image are extracted, and the cutoff frequency ωch in the horizontal direction is obtained by the least-square method. In addition, the maximum values of each row of the FFT data obtained from the same one frame of image are extracted, and the cutoff frequency ωcv in the vertical direction is obtained by the least-square method.

At this point, the results of deducing the cutoff frequencies ωch and ωcv for some standard still images are shown in Table 1. These images have been conventionally well-known for image evaluation.

TABLE 1

| Kind of Image | ωch | ωcv |
|---|---|---|
| Woman | 0.005454 | 0.001456 |
| Text | 0.003407 | 0.011715 |
| Lax | 0.006501 | 0.004094 |
| Girl | 0.003084 | 0.004162 |
| Cameraman | 0.004233 | 0.003166 |
| Bridge | 0.003455 | 0.005703 |
| Barbara | 0.004239 | 0.001900 |
| Lighthouse | 0.002540 | 0.005770 |

These results show that the cutoff frequencies ωch and ωcv are substantially within the range of between 0.001 and 0.01 [rad/sec]. Accordingly, in this embodiment, ten kinds of digital filters (each having a transfer function K1(z), K2(z), K3(z), . . . , and K10(z)) on the premise that they have analog frequency characteristics F(s) with a cutoff frequency ωc=0.001, 0.002, 0.003, . . . , and 0.01 [rad/sec] are designed in advance. Then, as shown in the following Table 2, the digital filter to be used is changed in accordance with the value of the cutoff frequencies ωch and ωcv which have been deduced from the image to be really processed.

TABLE 2

| ωc (ωch and ωcv) | Filter |
|---|---|
| ωc < 0.001 | K1 (z) |
| 0.001 ≤ ωc < 0.002 | K2 (z) |
| 0.002 ≤ ωc < 0.003 | K3 (z) |
| — | — |
| 0.008 ≤ ωc < 0.009 | K9 (z) |
| 0.009 ≤ ωc | K10 (z) |

Such a process enables a filtering with appropriate transfer characteristics adapted to the analog frequency characteristics of the image to be reproduced. Therefore, while accurately removing the block noise and mosquito noise associated with a coding/decoding process, it is possible to avoid unnecessarily removing information that seems to be a noise but is actually included in the original image.

Figure 3:
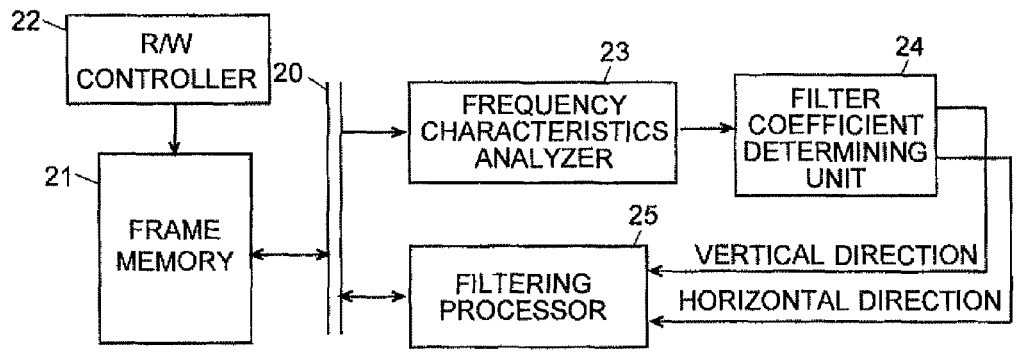
FIG. 3 is a schematic block configuration diagram of the apparatus for removing an image noise of an embodiment of the present invention.
Figure 4:
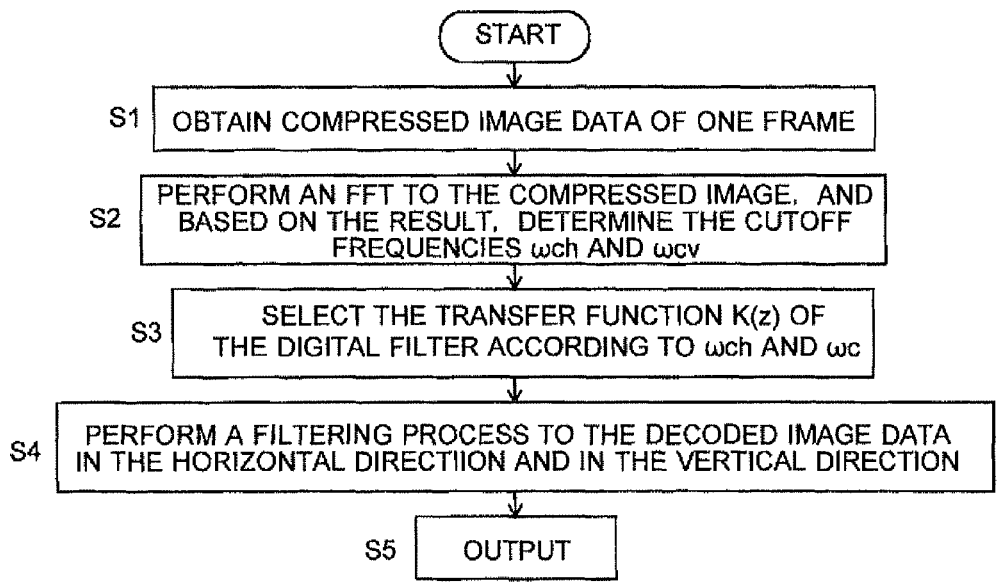
FIG. 4 is a flowchart illustrating a procedure of removing a noise in the apparatus for removing an image noise of the present embodiment.

FIG. 3 is a schematic block configuration diagram of the apparatus for removing an image noise of the present embodiment, and FIG. 4 is a flowchart illustrating a procedure of removing a noise in this apparatus.

The apparatus for removing an image noise of the present embodiment includes: a frame memory 21 for buffering the data (data of picture element values) of one decoded image or one frame of decoded image; an R/W controller 22 for controlling the reading and writing of the data from and to the frame memory 21; a frequency characteristics analyzer 23 for receiving the data which have been read out from the frame memory 21 to a data bus 20 and analyzing the frequency characteristics thereof; a filter coefficient determining unit 24 for determining, based on the analysis result, the filter coefficient of the digital filter; a filtering processor 25 for performing a filtering process to the data which have been read out from the frame memory 21; and other units.

Suppose that the filter coefficient determining unit 24 includes a set of information prepared in a tabular form or in other form, such as in Table 2, which illustrates the relationship between the cutoff frequency ωc (which reflects the analog frequency characteristics of the original signal) and the transfer function K(z) of the digital filter to be used as previously described. Accordingly, the filter characteristics (or filter coefficient) can be easily obtained from the cutoff frequency wc. To be more rigorous, preferably, a filter coefficient is calculated in advance for each of a plurality (e.g. 10 or 20) of cutoff frequencies, and when a cutoff frequency is given, an appropriate interpolation process is performed with a previously obtained filter coefficient to obtain the filter coefficient. This interpolation process can be performed by a linear interpolation, but more preferably, a Lagrange interpolation may be used.

First, when the data of one frame of image (or one image) decompressed by a decoding unit (which is not shown) are written in the frame memory 21 through the data bus 20 (Step S1), the image data are, under the control of the R/W controller 22, read out in a predetermined order from the frame memory 21 and sent to the frequency characteristics analyzer 23. The frequency characteristics analyzer 23 performs an FFT process as previously described to the image data to obtain the cutoff frequencies ωch and ωcv respectively in the horizontal direction and vertical direction (Step S2). Based on the previously prepared information as described earlier, the filter coefficient determining unit 24 selects the transfer functions K(z) that respectively corresponds to the cutoff frequencies ωch and ωcv, thus determining the digital filter (sampled-data $H^\infty$ filter) to be used for each of the vertical direction and the horizontal direction (Step S3).

To the decoded image data which have been read out from the frame memory 21, the filtering processor 25 performs a filtering process using the digital filter which has been determined as previously described, removing the noise associated with the encoding/decoding process (Step S4). The image data to which such a noise removing process has been performed is converted into an analog signal by a D/A converter, which is not shown, or converted into a digital signal string in a predetermined format, and then provided (Step S5).

In the apparatus for removing an image noise of the present embodiment, in performing a noise removal in the filtering processor 25, the sampled-data $H^\infty$ filter is combined with an ε-separating nonlinear filter. Since the aforementioned sampled-data $H^\infty$ filter turns out to be a linear lowpass filter, if an original signal exists in the same range of the frequency components of the noise, the high-frequency components of the original signal are also removed at the same time. Since many of such high-frequency components exist at the edges of character portions or boundaries of objects in an image, if the filtering process is performed without modification, the edges might become blurry, making particularly characters and other portions unreadable. Given this factor, an edge and noise are discriminated by the ε-separating nonlinear filter, and a filtering process by the sampled-data $H^\infty$ filter is not performed to the portion which has been determined to be an edge.

The ε-separating nonlinear filter performs a nonlinear process which is an extension of an finite impulse response (FIR) filter and is defined by the following equation (3):

$$y[n] = \sum_{k=-N_1}^{N_2} h_f[k] f_{\varepsilon D}(x[n-k], x[n]) \quad (3)$$

$$f\varepsilon(a, b) := \begin{cases} a, & |a-b| \leq \varepsilon \\ b, & |a-b| > \varepsilon \end{cases}$$

where, $h_f[k]$ ($-N_1 \leq k \leq N_2$) is a coefficient of the FIR filter, x, y are respectively the input and output, and ε is a threshold constant. On the assumption that the amplitude of the noise is smaller than the variation of the signals across an edge in the original signal, the ε-separating nonlinear filter discriminates between the noise and the edge of signals based on whether or not the amplitude is larger than the threshold ε. The process by the FIR filter is performed only to a portion where the amplitude is small, i.e. to a portion which can be identified to be a noise with high probability, and thereby the noise is removed without making the edges in the original signal blurry (refer to Non-Patent Document 1 for the detail of the ε-separating nonlinear filter).

In the apparatus for removing an image noise, in determining the cutoff frequency in Step S2 or in the filtering process in Step S4, the processing efficiency can be enhanced by performing the data processing in parallel as follows:

In this embodiment, suppose that the data which compose one frame of image are sequentially transferred, picture element by picture element, from the top row to the bottom row as a whole, and from left to right in each row. In the case of a moving image, suppose that such image data are transferred for each frame. In addition, suppose that on the input side the decoded image data are sent in as previously described, and the image data are sent out on the output side in the same manner.

In the parallel processing, the cutoff frequency determination process or the filtering process are performed not after all the data of one frame of image are received, but performed one after another from the received row while the data are being received. Let T be the time required to perform the process for one row of image data, and let T be the time required to receive the image data of one row. Given that an integer p is the integer part of τ/T, the process for the first row has been finished at the point in time when the image data of the $p+1^{st}$ row in one frame is received. Hence, the buffer and an arithmetic circuit (or a circuit for deduction and filtering process) used for the first row can be used for the process for the $p+1^{st}$ row.

Figure 6:
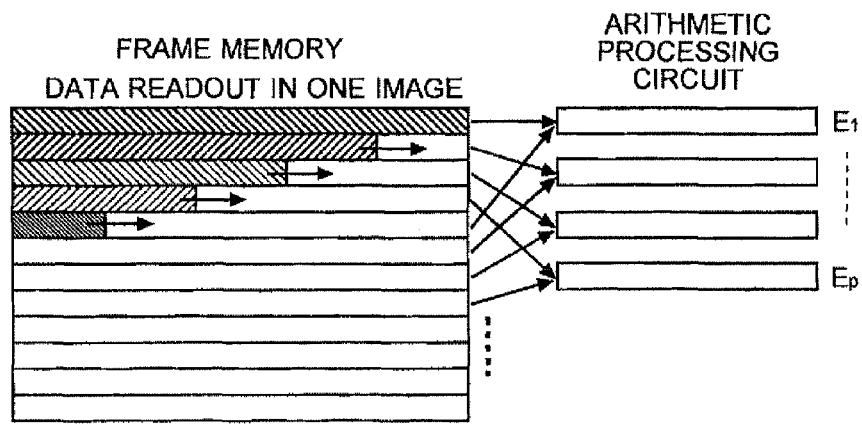
FIG. 6 is a pattern diagram for explaining a process procedure in the case where noise removing processes in the apparatus for removing an image noise of the present embodiment are performed in parallel.
Figure 6:
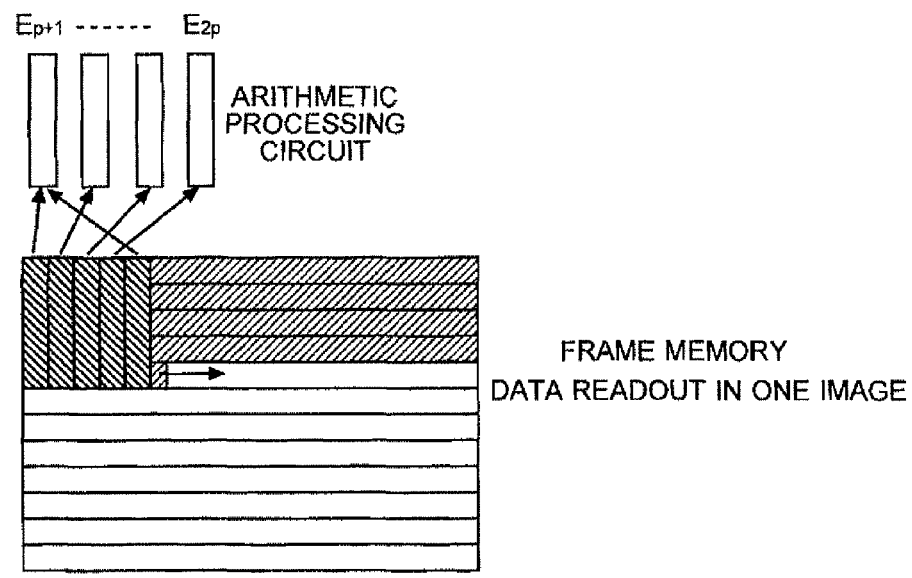

To be more precise, the operation can be performed as follows. That is, as the hardware, as illustrated in FIG. 6(a), p arithmetic processing circuits are prepared for the operation, in addition to the frame memory for one frame of image. The provided image data are sequentially stored in the frame memory, picture element by picture element. As illustrated in FIG. 6(a), when all the image data of the first row are accumulated in the frame memory, these data are read out to be given to the arithmetic processing circuit $E_1$, and the processing for the first row is initiated. In the same manner, when all the pieces of image data of the second row are accumulated in the frame memory, the processing for the second row is initiated by the subsequent arithmetic processing circuit $E_2$, and the processing for the third row, the processing for the fourth row, . . . are initiated by the arithmetic processing circuit $E_3, \ldots$, respectively. That is, the image data for p rows are processed in parallel. When all the image data of the $p+1^{st}$ row have been stored in the frame memory, the arithmetic processing circuit $E_1$ has already finished the arithmetic process for the first row. Therefore, the arithmetic processing circuit $E_1$, which was used for the first row, can be used to process the image data of the $p+1^{st}$ row.

The aforementioned process is performed in a horizontal direction, and the processing direction and the data transfer direction are the same. As for the process in a vertical direction, since the processing direction and the data transfer direction are different, the parallel processing as previously described cannot be performed. Further, in the case where a processing in a horizontal direction is first performed and then a processing in a vertical direction is performed, it is necessary to consider that the order of the incoming image data to which the processing in the horizontal direction has been performed is different from the order of the image data which had been provided. Given this factor, a processing in the vertical direction is not performed for each row, but a parallelization is performed for each picture element. Specifically, it is performed in the following manner. It should be noted that m signifies the number of taps.

That is, as the hardware, as illustrated in FIG. 6(b), p arithmetic processing circuits are prepared for the operation, in addition to the frame memory for one frame of image. Then, the incoming image data which have been processed in the horizontal direction are sequentially stored in the frame memory. When the image data of the $m+1^{st}$ column have been accumulated in the frame memory, the processing for the first column is initiated. That is, the image data of the first row in the first column are sent to the arithmetic processing circuit $E_{p+1}$ and the processing is initiated. T seconds later, the processing of the image data of the second row in the first column is initiated by using the arithmetic processing circuit $E_{p+2}$. In the same manner, processings are initiated with a delay of T seconds while different arithmetic processing circuits are assigned for each row. After $\tau$ (=$T_p$) seconds of the initiation of the processing, the processing for the first row in the first column is finished, and therefore the arithmetic processing circuit $E_{p+1}$ is assigned again for the image data of the first row in the p+1$^{st}$ column. When all the data of the second row have been stored in the buffer, the processing for the second row in the first column is initiated. In the same manner, all the image data of one frame are processed.

Such a parallel processing causes a time delay of approximately (p+m) T≈τ+mT seconds to an output moving image from an input moving image. However, since the aforementioned digital filter (sampled-data H$^\infty$ filter) can be generally created with a small number of (a few or several) taps, this time delay is so short that visually it is substantially negligible on streaming.

As just described, a cutoff frequency determination process of a filtering process can be performed without waiting until all the image data of one frame have been obtained. In particular, in performing a large-sized image, sequentially performing a processing to the data of an entire image requires a large amount of time, which is particularly disadvantageous in the case where a real-time processing such as a streaming is required. On the other hand, performing the data processing in parallel as previously described can enhance the processing efficiency. In the case where the number of picture elements in one frame of image, which may be for a mobile phone or other devices for example, is small, the processing time can be short without performing the parallel processing. This can reduce the circuit size and enables an easy control.

Figure 7:
FIG. 7 illustrates an example of an image before and after an image noise removing process according to the present invention.
Figure 8:
FIG. 8 illustrates another example of an image before and after an image noise removing process according to the present invention.
Figure 8:
Figure 9:
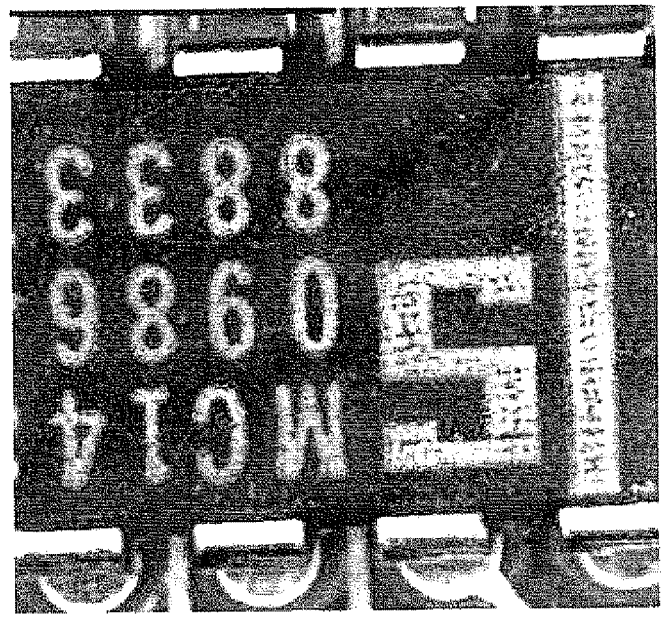
FIG. 9 illustrates another example of an image before and after an image noise removing process according to the present invention.
Figure 9:
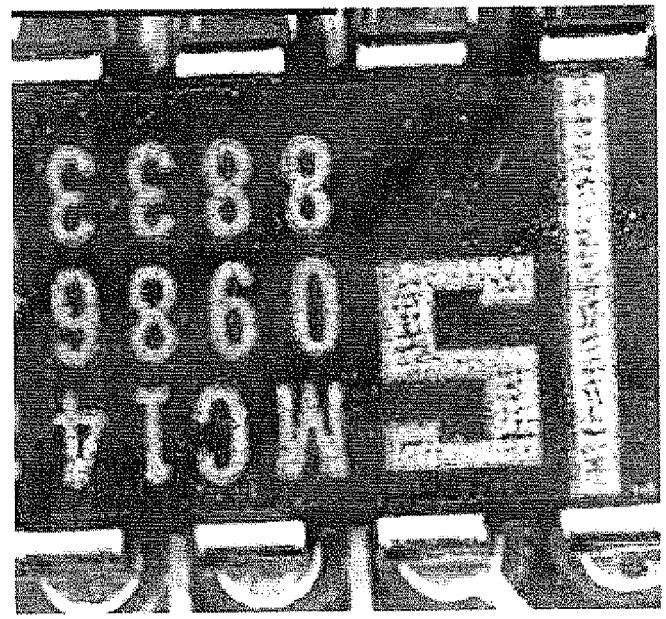

An example of the results of the simulation in which a noise of a still image is removed by using the method for removing an image noise according to one embodiment of the present invention is shown in FIGS. 7 through 9. These images are known as standard images for evaluation. In each figure, (a) shows an image before the image noise removing process, and (b) shows an image after the image noise removing process.

The unprocessed image illustrated in FIG. 7(a) is rough due to the block noise and mosquito noise, particularly on the face of the person and around the chair (upper left part of the image). On the other hand, as illustrated in FIG. 7(b), it can be seen that the noise removing process has reduced such noises. If such a noise removing process is performed in a conventional method, in many cases, a moiré appears on the stripe pattern of the scarf. However, in the method for removing an image noise according to the present invention, such a generation of moiré can also be prevented.

In the unprocessed image illustrated in FIG. 8(a), a mosquito noise is noticeable around the person and buildings. The processed image illustrated in FIG. 8(b) shows that such noise is finely removed. Furthermore, it can be seen that, even by such a process, the entire image is not blurry and the edges of the boundary of the person, buildings, and other portions remain.

In the unprocessed image illustrated in FIG. 9(a), there is a noise on the black board on which characters are written. However, the processed image illustrated in FIG. 9(b) shows that such a noise has been removed, making the characters sharp. These facts indicate that the method for removing an image noise according to the present invention has, by its nature, a beneficial effect for the application to the field of the automatic character recognition for example and other fields.

In the apparatus for removing an image noise by the first embodiment, both the cutoff frequency in the horizontal direction and the cutoff frequency in the vertical frequency in one image are obtained, and the noise removing processing is performed by using a digital filter having characteristics (i.e. a filter coefficient) corresponding to these cutoff frequencies. Therefore, although the filter characteristics in the horizontal direction and the filter characteristics in the vertical direction are different, the filter characteristics in the horizontal direction and the filter characteristics in the vertical direction in one image are each constant. Such a filtering process can averagely achieve a preferable performance for various kinds of images.

Meanwhile, in the case of an image in which a person or other objects exist on a plain background, generally, the analog frequency characteristics are significantly different between at the part of the background and at the part of the person. Particularly for such an image, it is expected that a more efficient noise removal can be achieved by applying a digital filter having optimum characteristics for each portion with similar frequency characteristics of the original signal. In the apparatus for removing an image noise by the second embodiment, which will be hereinafter explained, the filter characteristics are changed not by the image, but with respect to small areas in an image of a complete image or a frame of image.

Figure 10:
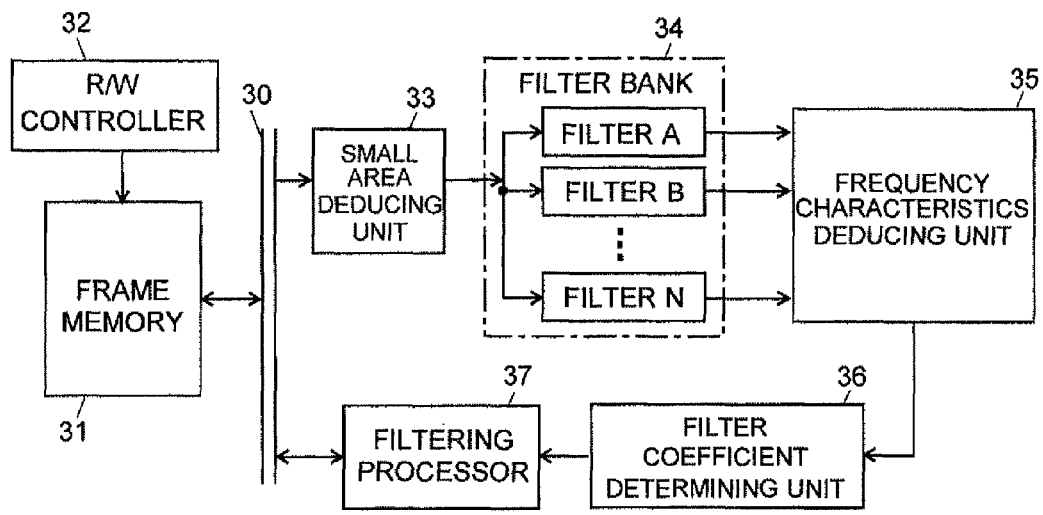
FIG. 10 is a schematic block configuration diagram of the apparatus for removing an image noise of another embodiment of the present invention.
Figure 11:
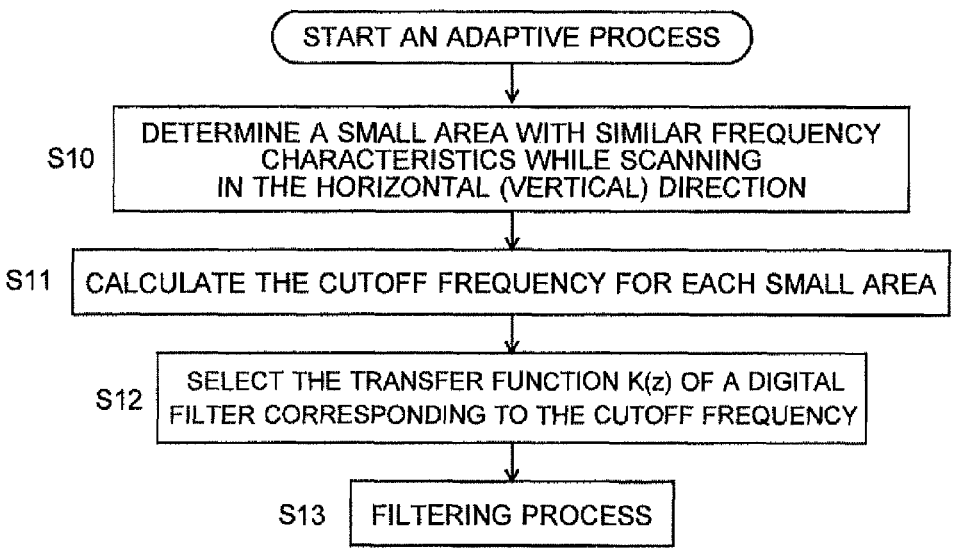
FIG. 11 is a flowchart illustrating a procedure of an adaptive process in the method for removing an image noise of another embodiment of the present invention.
Figure 12:
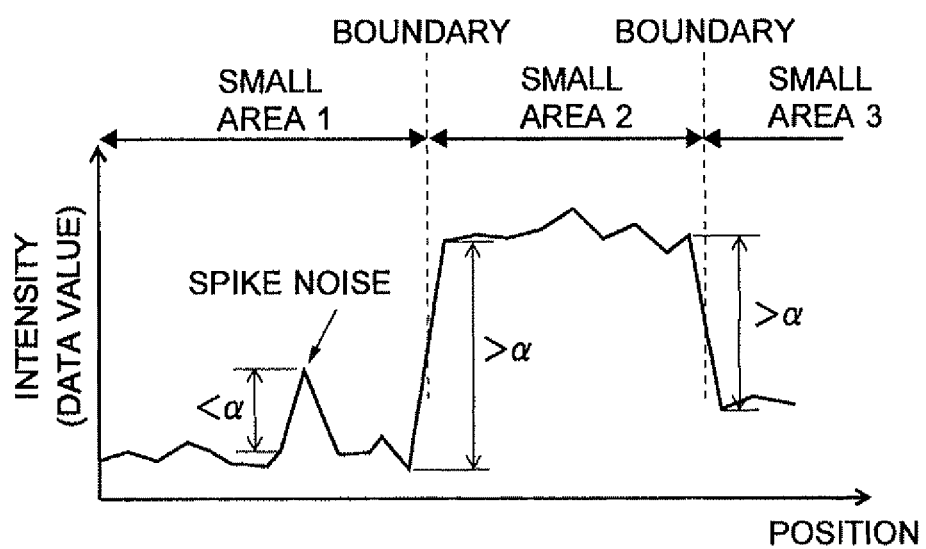
FIG. 12 is an explanation diagram of an adaptive process in the method for removing an image noise of another embodiment of the present invention.

FIG. 10 is a schematic block configuration diagram of the apparatus for removing an image noise of this second embodiment, FIG. 11 is a flow chart showing a procedure of the characteristic process in this apparatus, and FIG. 12 is an explanation diagram for the process.

The apparatus for removing an image noise of the second embodiment includes: a frame memory 31 for buffering the data of an image of a complete image or a frame of decoded image; an R/W controller 32 for controlling the reading and writing of the data from and to the frame memory 31; a small area deducing unit 33 for receiving the data which have been read out from the frame memory 31 to a data bus 30 and deducing the range of a small area having similar frequency characteristics; a filter bank 34 and a frequency characteristics deducing unit 35, both for analyzing the frequency characteristics of each of the plural pieces of data included in the small area; a filter coefficient determining unit 36 for determining, based on the analysis result, the filter coefficient of the digital filter; a filtering processor 37 for performing a filtering process to the data which have been read out from the frame memory 31; and other units. The filter bank 34 has a large number of band-pass filters arranged in parallel, each having a different pass band. The frequency characteristics deducing unit 35 analyzes each of the data which has passed each of the large number of band-pass filters to choose the frequency band with the largest number of components, and determines the cutoff frequency.

Figure 5:
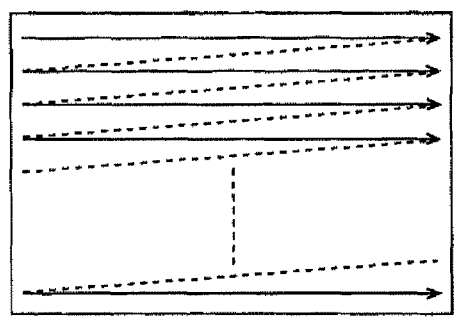
FIG. 5 is a pattern diagram illustrating a sequence of transferring image data which compose a frame of image, in the apparatus for removing an image noise of the present embodiment.

While the image data of an image of a complete image or a frame of image are stored in the frame memory 31 for example, the image data are sequentially read out in the horizontal direction as illustrated in FIG. 5 to be provided to the small area deducing unit 33. The small area deducing unit 33 observes the variation of the image data values, i.e. the picture element values, and determines whether or not the amount of change exceeds a predetermined threshold α. In one horizontal scan, any point where the amount of the change of the picture element value exceeds the threshold α is regarded as a boundary of a small area, and the section between one boundary and the next boundary is treated as one small area (Step S10). That is, since a point where the picture element value significantly changes can be considered to be a point where the frequency characteristics of the original signal significantly changes, the small area which is set as previously described can be considered to be an area having relatively similar frequency characteristics. For example, if picture element values change as shown in FIG. 12 when the picture elements are sequentially scanned in the horizontal direction, the picture element values are sectionalized into small area 1, small area 2, and small area 3, with the boundaries set at the points where the amount of change exceeds the threshold α. This threshold α may be the same as the threshold c used in the case of applying the ϵ-separating nonlinear filter.

As shown in FIG. 12, a spike-like noise in which the variation of the picture element value is relatively small is ignored. Since the filter characteristics are changed for each small area as will be described later, if a small area which is composed of only one point or a very few points is allowed, it is difficult to set appropriate filter characteristics. Given this factor, preferably the following process may be performed. When the state in which the picture element value does not exceed the threshold α lasts for equal to or more than a predetermined number of points after a change has occurred in which the picture element value exceeds the threshold α, the area is considered to be a small area. On the other hand, in the case where a change occurs in which the picture element value exceeds the threshold α again within a predetermined number of points after a change has occurred in which the picture element value exceeds the threshold α, the area is not considered to be a small area and eliminated from the object of the filtering process. Preferably, a small area which is composed of one point or a few points may be allowed at the edges of an image.

The filter bank 34 and the frequency characteristics deducing unit 35 examine the frequency characteristics of plural image data contained in one small area to obtain the cutoff frequency ωc (Step S11). Therefore, taking FIG. 12 as an example, the small area 1 and the small area 2 may have a different cutoff frequency ωc. The filter coefficient determining unit 36 calculates the filter coefficient in order to select the transfer function K(z) of a digital filter corresponding to the cutoff frequency obtained for each small area (Step S12). The filter coefficient may be obtained by using a table such as Table 2 as in the first embodiment, or may be obtained by performing an interpolation process based on the correspondence relationship between a plurality of cutoff frequencies and filter coefficients.

When the ranges of the small areas and the corresponding filter characteristics (filter coefficient) are determined in one frame of or one image as just described, the filtering processor 37 performs a filtering process to each picture element value by using a digital filter while using appropriate filter characteristics determined for each small area (Step S13). After a process in the horizontal direction has finished, the same process can be performed in the vertical direction, so that the noise associated with a coding/decoding process can be removed well.

As explained in the first embodiment, also in the apparatus for removing an image noise of the second embodiment, performing a parallel processing can increase the processing speed in spite of the increase of hardware, as a matter of course.

As just described, in the apparatus for removing an image noise of the second embodiment, the filter characteristics are adaptively changed, i.e. in accordance with the deduction results of the analog frequency characteristics of the original signal, in one frame of image or one image. Therefore, an appropriate noise removal can be performed each to a plain background portion generally having a low frequency and to a person or other objects having a relatively high frequency. According to the study of the inventors of the present patent application, compared to the case where a filtering process with static filter characteristics (which will be hereinafter referred to as the "static filtering process") as in the first embodiment is performed, a filtering process with adaptive filter characteristics (which will be hereinafter referred to as the "adaptive filtering process") as in the second embodiment has the tendency that fine patterns, shadings, or otherwise existing in the original image are not removed to achieve a more natural image quality, although the residue of mosquito noise and other noise slightly increases.

As an evaluation approach of the difference of the effects of the static filtering process and those of the adaptive filtering process, square errors were calculated based on the original, uncompressed still image (a file in BMP format). The results are shown in Table 3.

TABLE 3

| Kind of Image | Square Error | |
|---|---|---|
| | Static | Adaptive |
| Woman | 0.0405 | 0.0236 |
| Text | 0.0317 | 0.0312 |
| Lax | 0.0480 | 0.0466 |
| Girl | 0.0262 | 0.0207 |
| Cameraman | 0.0385 | 0.0272 |
| Bridge | 0.0519 | 0.0460 |
| Barbara | 0.0411 | 0.0252 |
| Lighthouse | 0.0432 | 0.0342 |

The computational expression of the square error E(Y) is expressed by the following expression (4), where X[n, m] and Y[n, m] are the picture element values at the position [n, m] respectively in the original still image and in the image after the filtering process.

$$E(Y) = \frac{1}{256} \sqrt{\sum_{n,m} (x[n, m] - Y[n, m])^2} \tag{4}$$

Although the effect varies depending on the kind of image, the square errors are smaller in the adaptive filtering process than in the static filtering process. This indicates that the images processed by the adaptive filtering process are closer to the original image.

Figure 13:
FIG. 13, which is an example illustrating a result of a simulation of an image noise removing process of the present invention, shows an original image named "Barbara."
Figure 14:
FIG. 14, which is an example illustrating a result of a simulation of an image noise removing process of the present invention, shows an image illustrating a result of a static filtering process performed to FIG. 13.
Figure 15:
FIG. 15, which is an example illustrating a result of a simulation of an image noise removing process of the present invention, shows an image illustrating a result of an adaptive filtering process performed to FIG. 13.
Figure 16:
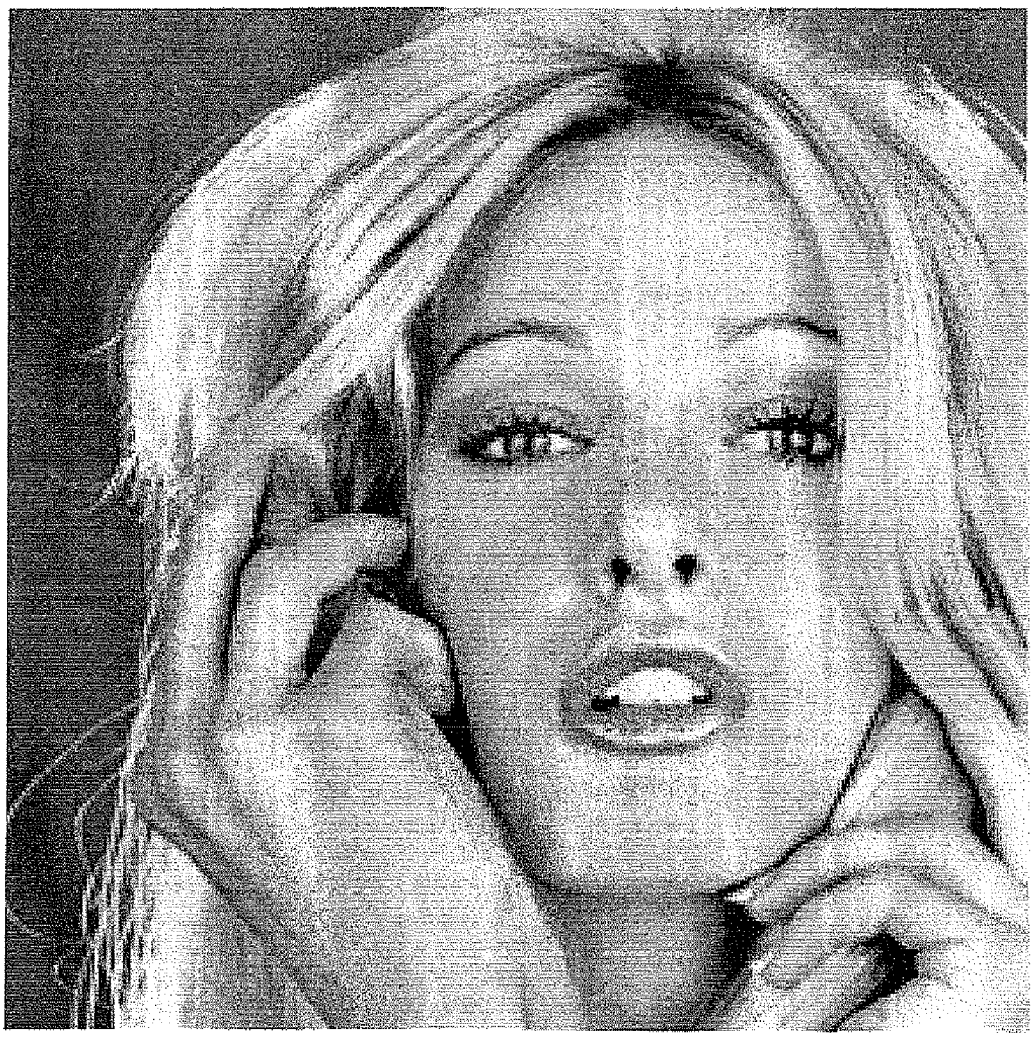
FIG. 16, which is an example illustrating a result of a simulation of an image noise removing process of the present invention, shows an original image named "Woman."
Figure 17:
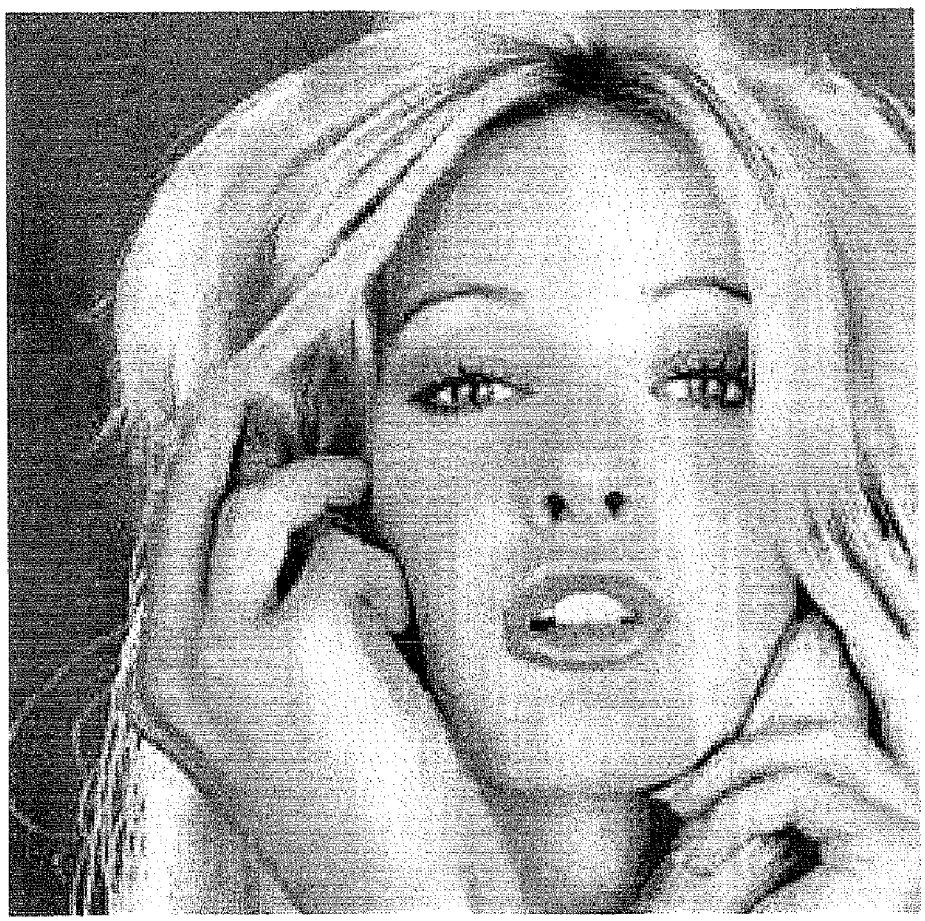
FIG. 17, which is an example illustrating a result of a simulation of an image noise removing process of the present invention, shows an image illustrating a result of a static filtering process performed to FIG. 16.
Figure 18:
FIG. 18, which is an example illustrating a result of a simulation of an image noise removing process of the present invention, shows an image illustrating a result of an adaptive filtering process performed to FIG. 16.
Figure 19:
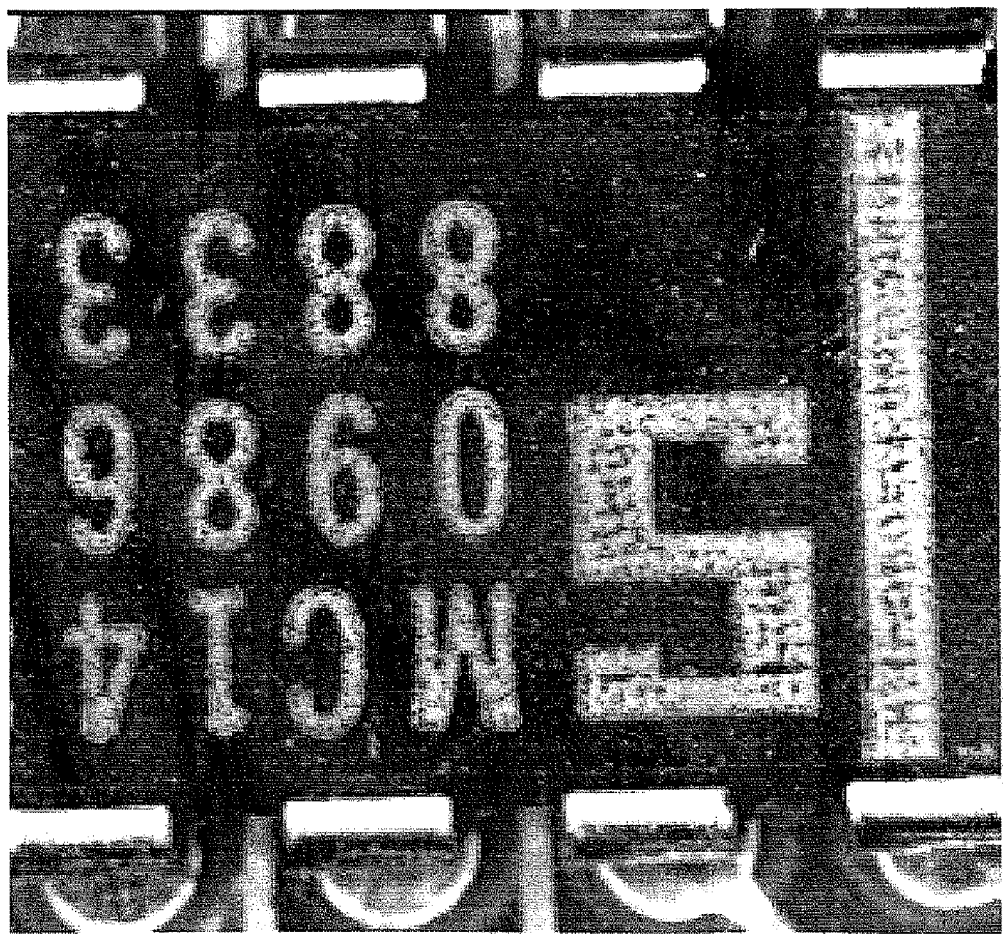
FIG. 19, which is an example illustrating a result of a simulation of an image noise removing process of the present invention, shows an original image named "Text."
Figure 20:
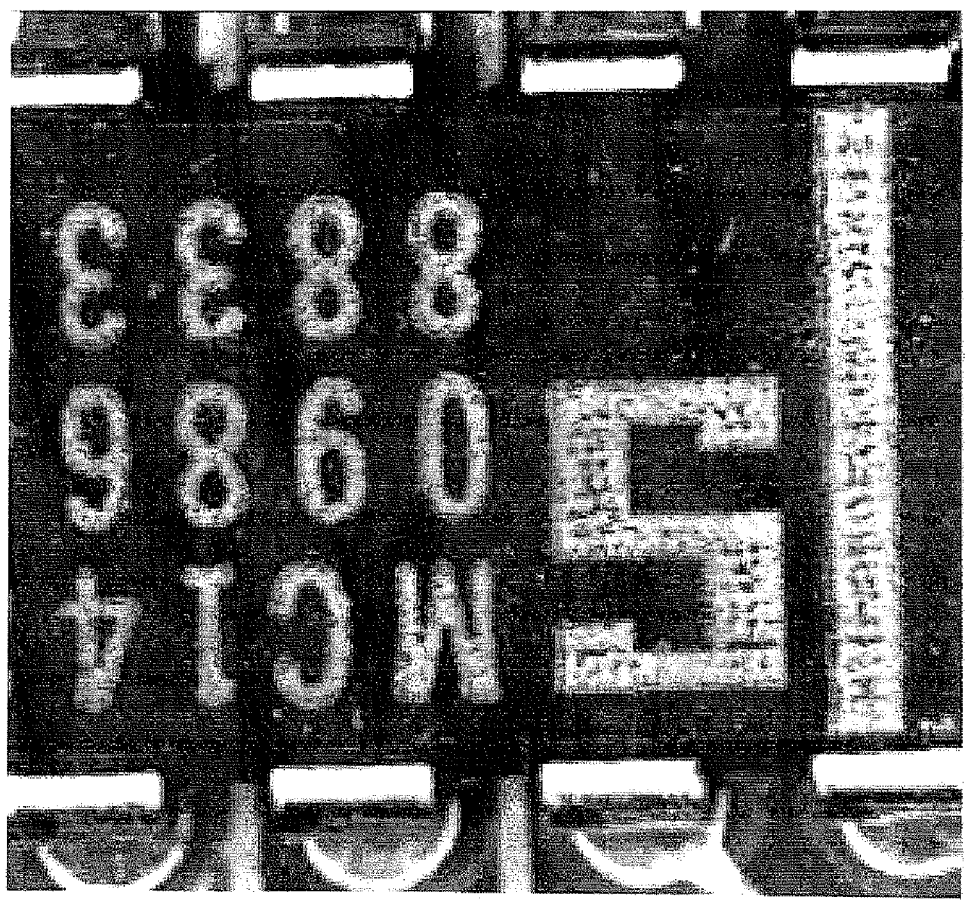
FIG. 20, which is an example illustrating a result of a simulation of an image noise removing process of the present invention, shows an image illustrating a result of a static filtering process performed to FIG. 19.
Figure 21:
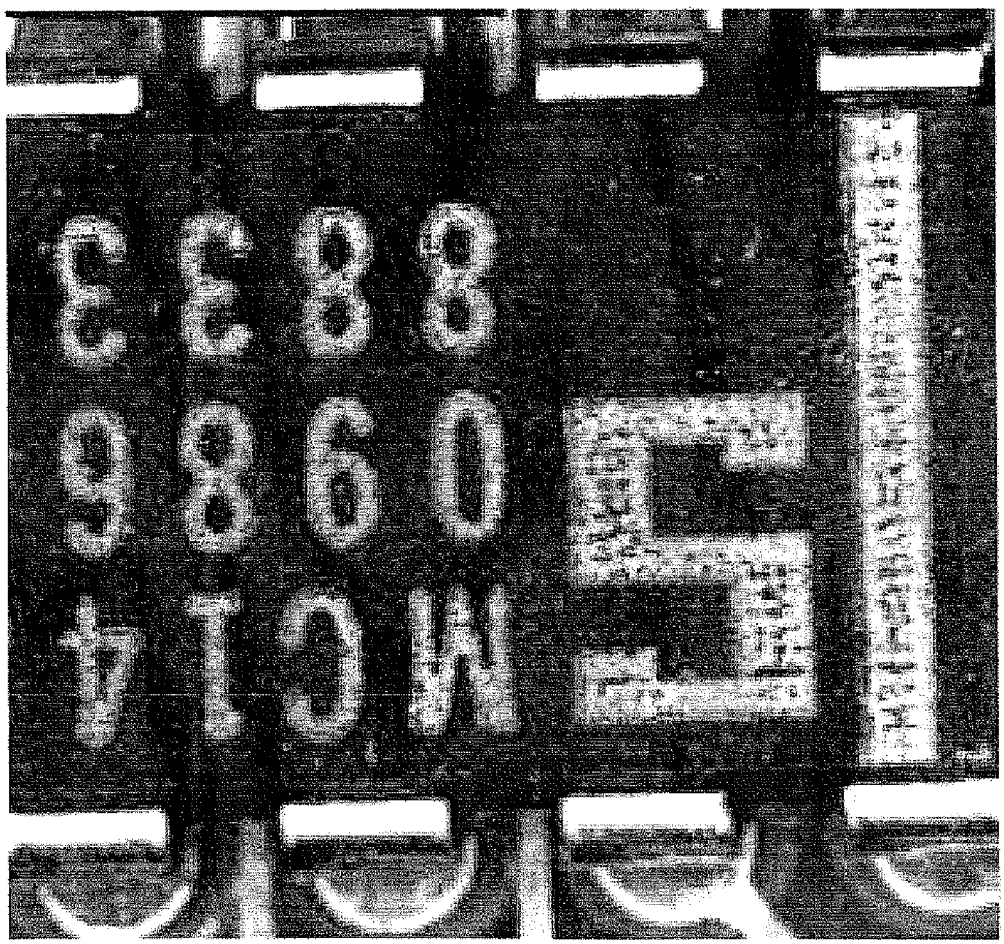
FIG. 21, which is an example illustrating a result of a simulation of an image noise removing process of the present invention, shows an image illustrating a result of an adaptive filtering process performed to FIG. 19.

An example of the results of the simulation in which the noise of a still image is removed by the static filtering process and the adaptive filtering process is illustrated in FIGS. 13 through 21. FIGS. 13, 16, and 19 are respectively the original images of Barbara, Woman, and Text for evaluation. FIGS. 14, 17, and 20 are the image after the static filtering process to the original image of Barbara, Woman, and Text. FIGS. 15, 18, and 21 are the image after the adaptive filtering process to the original image of Barbara, Woman, and Text.

As can be seen by comparing FIGS. 14 and 15, and FIGS. 17 and 18, the concavity and convexity and other texture of the skin surface of the person appear to be clearer in the result of the adaptive filtering process than in the result of the static filtering process. Hence, the adaptive filtering process is excellent at representing the expression of a person or the like. In addition, as can be seen by comparing FIGS. 20 and 21, while the concavity and convexity of the plate on which characters are written appear finely in the image after the adaptive filtering process, the concavity and convexity have fairly disappeared in the image after the static filtering process. This shows that even though an image after the static filtering process may be apparently clear, it tends to be an unattractive image.

In principle, in the static filtering process, the process is performed evenly to the entire image. Hence, fine portions (e.g. fine concavities and convexities of the skin surface as previously described) of an image are tend to be smoothened and disappear. On the other hand, in the adaptive filtering process, a process with different filter characteristics is performed to each portion even in one image. Hence, fine portions remain to some extent. Instead, the mosquito noise and other noise are not removed as much as by the static filtering process. Therefore, the static filtering process is more suitable for such an image in which such noises are very noticeable. Accordingly, it is possible to perform a method in which the adaptive filtering process and the static filtering process are changed in accordance with the kind of the object image.

It should be noted that the embodiments described thus far are merely an example of the present invention, and it is evident that any modification, adjustment, or addition made within the spirit of the present invention is also included in the scope of the claims of the present application.

The invention claimed is:

1. A method for removing image noise, which is generated when image data compression-encoded in a given format is decoded to reproduce an image, comprising:
   a) a deduction step for examining a digital frequency response of image data composing an image of a complete image or a frame of an image, and which have been compression-encoded and decoded, to deduce analog frequency characteristics of the image before compression encoding, wherein in the deduction step, a cutoff frequency is calculated from FFT data obtained by performing an FFT on an image for one frame of a moving image, based on an assumption that the analog frequency characteristics of the image before compression encoding are the analog frequency characteristics of a lowpass filter having attenuation characteristics of a given order;
   b) a parameter setting step for changing a parameter of a sampled-data $H^\infty$ filter in accordance with a deduction result by the deduction step, the parameter being a filter coefficient; and
   c) a processing step for performing a filtering process on the image data after the image data is decoded and before the image data is converted by using the sampled-data $H^\infty$ filter having a parameter calculated by solving a computational equation with $H^\infty$ control under a predetermined condition or with a rigorous calculation which corresponds to the $H^\infty$ control, the computational equation being obtained by approximately converting a conditional equation to a finite-dimensional discrete-time system, and the conditional equation being set to design the sampled-data $H^\infty$ filter so as to reduce an error between an original analog image signal and an analog image signal obtained through an analog to digital conversion, a coding and decoding process, and a digital to analog conversion.

2. The method for removing an image noise according to claim 1, wherein:
   the filtering process in the processing step is performed to each of image data aligned in a horizontal direction and image data aligned in a vertical direction of an image of a complete image or a frame of image.

3. The method for removing an image noise according to claim 1, wherein:
   in the deduction step, an image of a complete image or a frame of image is sectionalized into small areas in each of which the analog frequency characteristics in the image before compression encoding can be considered to be similar and the analog frequency characteristics are deduced for each of the small areas; and
   in the parameter setting step, the parameter of the digital filter is changed for each of the small areas.

4. The method for removing an image noise according to claim 3, wherein:
   in the deduction step, image data of an image of a complete image or a frame of image aligned in a horizontal direction or in a vertical direction are sequentially scanned, and a boundary of the small areas is defined where a variation of a value of the data is equal to or more than a predetermined threshold.

5. The method for removing an image noise according to claim 3, wherein:
   in the deduction step, a cutoff frequency is calculated on an assumption that the analog frequency characteristics in the image before compression encoding are a lowpass filter having attenuation characteristics of a given order.

6. The method for removing an image noise according to claim 1, wherein the given order is a first order.

7. The method for removing an image noise according to claim 1, wherein:
   in the processing step, the sampled-data $H^\infty$ filter is combined with an $\epsilon$-separating nonlinear filter.

8. The method for removing an image noise according to claim 1, wherein a processing object is a still image which is compression-encoded in JPEG format.

9. The method for removing an image noise according to claim 1, wherein a processing object is a moving image which is compression-encoded in MPEG format.

10. An apparatus for removing image noise, which is generated when image data compression-encoded in a given format is decoded to reproduce an image, comprising:
    a) a deduction means for examining a digital frequency response of image data composing an image of a complete image or a frame of an image, and which have been compression-encoded and decoded, to deduce analog frequency characteristics of the image before compression encoding, wherein in the deduction step, a cutoff frequency is calculated from FFT data obtained by performing an FFT on an image for one frame of a moving image, based on an assumption that the analog frequency characteristics of the image before compression encoding are the analog frequency characteristics of a lowpass filter having attenuation characteristics of a given order;
    b) a parameter setting means for changing a parameter of a sampled-data $H^\infty$ filter in accordance with a deduction result by the deduction means, the parameter being a filter coefficient; and
    c) a processing means for performing a filtering process on the image data after the image data is decoded and before the image data is converted by using the sampled-data $H^\infty$ filter having a parameter calculated by solving a computational equation with $H^\infty$ control under a predetermined condition or with a rigorous calculation which corresponds to the $H^\infty$ control, the computational equation being obtained by approximately converting a conditional equation to a finite-dimensional discrete-time system, and the conditional equation being set to design the sampled-data $H^\infty$ filter so as to reduce an error between an original analog image signal and an analog image signal obtained through an analog to digital conversion, a coding and decoding process, and a digital to analog conversion.

11. The apparatus for removing an image noise according to claim 10, wherein:
the processing means performs the filtering process to each of image data aligned in a horizontal direction and image data aligned in a vertical direction of an image of a complete image or a frame of image.

12. The apparatus for removing an image noise according to claim 10, wherein:
the deduction means sectionalizes an image of a complete image or a frame of image into small areas in each of which the analog frequency characteristics in the image before compression encoding can be considered to be similar and deduces the analog frequency characteristics for each of the small areas; and
the parameter setting means changes the parameter of the digital filter for each of the small areas.

13. The apparatus for removing an image noise according to claim 12, wherein:
the deduction means sequentially scans image data of an image of a complete image or a frame of image aligned in a horizontal direction or in a vertical direction, and a boundary of the small areas is defined where a variation of a value of the data is equal to or more than a predetermined threshold.

14. The apparatus for removing an image noise according to claim 12, wherein:
the deduction means calculates a cutoff frequency on an assumption that the analog frequency characteristics in the image before compression encoding are a lowpass filter having attenuation characteristics of a given order.

15. The apparatus for removing an image noise according to claim 10, wherein:
the deduction means calculates a cutoff frequency on an assumption that the analog frequency characteristics in the image before compression encoding are a lowpass filter having attenuation characteristics of a given order.

16. The apparatus for removing an image noise according to claim 15, wherein the given order is a first order.

17. The apparatus for removing an image noise according to claim 10, wherein:
the processing means combines the sampled-data $H^\infty$ filter with an s-separating nonlinear filter.

18. The apparatus for removing an image noise according to claim 10, wherein a processing object is a still image which is compression-encoded in JPEG format.

19. The apparatus for removing an image noise according to claim 10, wherein a processing object is a moving image which is compression-encoded in MPEG format.

* * * * *